United States Patent
Ostrowski et al.

(10) Patent No.: US 10,518,602 B2
(45) Date of Patent: Dec. 31, 2019

(54) AUTOMATIC CONTROL OF HEATING AND COOLING OF A VEHICLE SEATING ASSEMBLY PURSUANT TO PREDICTIVE MODELING THAT RECALIBRATES BASED ON OCCUPANT MANUAL CONTROL

(71) Applicant: Ford Global Technologies, LLC, Dearborn, MI (US)

(72) Inventors: David Ostrowski, Northville, MI (US); Elizabeth Anne Manwell, Canton, MI (US); William G. Herbert, Bloomfield Hills, MI (US); Mohan John, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 154 days.

(21) Appl. No.: 15/836,245

(22) Filed: Dec. 8, 2017

(65) Prior Publication Data
US 2019/0176568 A1 Jun. 13, 2019

(51) Int. Cl.
*B60H 1/00* (2006.01)
*B60R 21/015* (2006.01)
(Continued)

(52) U.S. Cl.
CPC ....... *B60H 1/00285* (2013.01); *B60H 1/0073* (2019.05); *B60H 1/00742* (2013.01);
(Continued)

(58) Field of Classification Search
CPC ............ B60H 1/00285; B60H 1/00742; B60H 1/00764; B60H 1/00878; B60R 21/0154; B60N 2/56
See application file for complete search history.

(56) References Cited

U.S. PATENT DOCUMENTS

| 5,187,943 | A | * | 2/1993 | Taniguchi | .......... B60H 1/00742 62/180 |
| 6,237,675 | B1 | | 5/2001 | Oehring et al. | |

(Continued)

FOREIGN PATENT DOCUMENTS

WO 2016070052 A1 5/2016

OTHER PUBLICATIONS

RuleQuest Research Data Mining Tools, Release 2.07 GPL Edition (C.50 Program); http://www.rulequest.com/.
(Continued)

*Primary Examiner* — Marc E Norman
(74) *Attorney, Agent, or Firm* — Vichit Chea; Price Heneveld LLP

(57) ABSTRACT

A method of controlling a temperature altering element within a seating assembly of a vehicle comprising: presenting a vehicle including a seating assembly including a temperature altering element, a controller in communication with the temperature altering element, the controller including a Pre-established Predictive Activation Model setting forth rules governing the activation of the temperature altering element as a function of data relating to Certain Identifiable Conditions, and a user interface configured to allow the temperature altering element to be manually activated or deactivated; occupying the seating assembly with a first occupant; collecting data relating to the Certain Identifiable Conditions while the first occupant is occupying the seating assembly; determining, by comparing the collected data to the rules of the Pre-established Predictive Activation Model, whether the collected data satisfies the rules of the Pre-established Predictive Activation Model so as to activate the temperature altering element; and activating the temperature altering element.

17 Claims, 10 Drawing Sheets

(51) Int. Cl.
*G06F 17/18* (2006.01)
*G06N 5/02* (2006.01)
*B60N 2/56* (2006.01)
B60H 1/22 (2006.01)
B60H 1/32 (2006.01)

(52) U.S. Cl.
CPC ..... *B60H 1/00764* (2013.01); *B60H 1/00807* (2013.01); *B60H 1/00878* (2013.01); *B60H 1/00964* (2013.01); *B60H 1/00985* (2013.01); *B60N 2/56* (2013.01); *B60R 21/0154* (2014.10); *G06F 17/18* (2013.01); *G06N 5/025* (2013.01); *B60H 2001/224* (2013.01); *B60H 2001/2246* (2013.01); *B60H 2001/3255* (2013.01); *B60K 2370/11* (2019.05); *B60Y 2400/302* (2013.01)

(56) References Cited

U.S. PATENT DOCUMENTS

| | | | |
|---|---|---|---|
| 6,454,178 | B1 | 9/2002 | Fusco et al. |
| 6,698,663 | B2 | 3/2004 | Wang et al. |
| 8,082,979 | B2 | 12/2011 | Greiner et al. |
| 8,800,644 | B2 | 8/2014 | Greiner et al. |
| 9,159,232 | B2 | 10/2015 | Ricci |
| 9,555,689 | B2 | 1/2017 | Sebastian et al. |
| 9,688,281 | B2 | 6/2017 | Parundekar |
| 2003/0039298 | A1 | 2/2003 | Eriksson et al. |
| 2012/0312520 | A1* | 12/2012 | Hoke ............... B60H 1/00285 165/203 |
| 2015/0197136 | A1* | 7/2015 | Chen ............... B60H 1/00285 62/3.61 |
| 2017/0036511 | A1 | 2/2017 | Lee et al. |
| 2017/0158023 | A1 | 6/2017 | Stevanovic et al. |
| 2017/0282685 | A1* | 10/2017 | Bader ............... B60H 1/00742 |

OTHER PUBLICATIONS

Mark Hall, M5PBase. Implements Base Routines for Generating M5 Model Trees and Rules, Weka; http://weka.sourceforge.net/doc.stable/weka/classifiers/trees/M5P.html.

Frank et al., Class Random Tree, Class for Constructing a Tree That Considers K Randomly Chosen Attributes at Each Node. Performs No Pruning. Also Has an Option to Allow Estimation of Class Probabilities (or Target Mean in the Regression Case) Based on a Hold-Out Set (Backfitting), Weka; http://weka.sourceforge.net/doc.dev/weka/classifiers/trees/RandomTree.html.

Malcom Ware, Class MultilayerPerceptron, A classified that uses backpropagation to classify instances. This network can be built by hand, created by an algorithm or both. The network can also be monitored and modified during training time. The nodes in this network are all sigmoid (except for when the class is numeric in which case the the output nodes become unthresholded linear units)., Weka; http://weka.sourceforge.net/doc.stable/weka/classifiers/functions/MultilayerPerceptron.html.

* cited by examiner

AUTOMATIC CONTROL OF HEATING AND COOLING OF A VEHICLE SEATING ASSEMBLY PURSUANT TO PREDICTIVE MODELING THAT RECALIBRATES BASED ON OCCUPANT MANUAL CONTROL

FIELD OF THE INVENTION

The present invention generally relates to the heating and cooling of a seating assembly of a vehicle.

BACKGROUND OF THE INVENTION

A vehicle typically includes a seating assembly designated for an operator occupant of the vehicle. The seating assembly sometimes includes a temperature altering element that can selectively provide heat to or take away heat from (i.e., cool) the seating assembly, which increases the comfort of the occupant of the seating assembly. The occupant of the seating assembly typically has to activate and deactivate manually, through a user interface, the temperature altering element.

SUMMARY OF THE INVENTION

According to an aspect of the present invention, a method of controlling a temperature altering element within a seating assembly of a vehicle comprises: presenting a vehicle comprising a seating assembly including a temperature altering element, a controller in communication with the temperature altering element, the controller including a Pre-established Predictive Activation Model setting forth rules governing the activation of the temperature altering element as a function of data relating to Certain Identifiable Conditions, and a user interface configured to allow the temperature altering element to be manually activated or deactivated; occupying the seating assembly with a first occupant; collecting data relating to the Certain Identifiable Conditions while the first occupant is occupying the seating assembly; determining, by comparing the collected data to the rules of the Pre-established Predictive Activation Model, whether the collected data satisfies the rules of the Pre-established Predictive Activation Model so as to initially automatically activate the temperature altering element; and automatically activating the temperature altering element.

Embodiments of this aspect of the invention can include any one or a combination of the following features:
- the Pre-established Predictive Activation Model was formed pursuant to a classification and regression tree analysis of input data related to the Certain Identifiable Conditions collected from other operators of other vehicles;
- the Pre-established Predictive Activation Model establishes rules that are a function of at least the following Certain Identifiable Conditions: ambient temperature; temperature set point for an interior of the vehicle; the time of day; whether the occupant has requested the vehicle to heat the interior with a blower at a certain blower speed; the temperature of the interior of the vehicle; and the temperature differential between the ambient temperature and the in-vehicle temperature;
- the Pre-established Predictive Activation Model establishes rules that are a function of at least the following Certain Identifiable Conditions: whether the windshield wipers have been activated; whether air conditioning has been activated; temperature set point for an interior of the vehicle; the ambient temperature; level at which the vehicle's climate control system is blowing air; engine speed; vehicle speed; and in-vehicle temperature;
- the Pre-established Predictive Activation Model establishes rules that are a function of at least the following Certain Identifiable Conditions: the in-vehicle temperature; the ambient temperature; level at which the vehicle's climate control system is blowing air; whether a rear window defrost has been activated; vehicle speed; whether air conditioning has been activated; engine speed; and whether the windshield wipers have been activated;
- when the ambient temperature is greater than a certain temperature, the controller automatically activates the temperature altering element pursuant to the Pre-established Predictive Activation Model as a function of data relating to at least one other Certain Identifiable Condition not including the ambient temperature;
- when the ambient temperature is less than the certain temperature, the controller automatically activates the temperature altering element pursuant to the Pre-established Predictive Activation Model as a function of data relating to at least one other Certain Identifiable Condition not including the ambient temperature;
- when the windshield wipers have been activated, the controller does not automatically activate the temperature altering element pursuant to the Pre-established Predictive Activation Model;
- when the windshield wipers have not been activated, the controller automatically activates the temperature altering element pursuant to the Pre-established Predictive Activation Model as a function of data relating to at least one other Certain Identifiable Condition not including whether the windshield wipers have been activated;
- when the in-vehicle temperature is less than a certain temperature, the controller does not automatically activate the temperature altering element to impart cooling pursuant to the Pre-established Predictive Activation Model;
- when the in-vehicle temperature is greater than the certain temperature, the controller automatically activates the temperature altering element to impart cooling pursuant to the Pre-established Predictive Activation Model as a function of data;
- the Pre-established Predictive Activation Model establishes rules for activation of the temperature altering element to provide cooling and the rules are a function of data related to at least the following Certain Identifiable Conditions: ambient temperature; the in-vehicle temperature; whether a rear window defrost has been activated; and a temperature set point for an interior of the vehicle;
- when the ambient temperature is less than a certain temperature and the in-vehicle temperature is greater than another certain temperature, the controller automatically activates the temperature altering element to impart cooling pursuant to the rules of the Pre-established Predictive Activation Model as a function of data relating to at least one other certain identifiable condition including vehicle speed;
- when the ambient temperature is greater than the certain temperature, the controller automatically activates the temperature altering element to impart cooling pursuant to the rules of the Pre-established Predictive Activation Model as a function of data relating to at least one other certain identifiable condition;

automatically deactivating the temperature altering element pursuant to the Pre-established Predictive Activation Model, after initially automatically activating the temperature altering element pursuant to the Pre-established Predictive Activation Model, if the collected data relating to the Certain Identifiable Conditions collected after initially automatically activating the temperature altering element satisfy the rules of the Pre-established Predictive Activation Model for deactivation of the temperature altering element;

automatically reactivating the temperature altering element pursuant to the Pre-established Predictive Activation Model, after automatically deactivating the temperature altering element pursuant to the Pre-established Predictive Activation Model, if the collected data relating to the Certain Identifiable Conditions collected after deactivating the temperature altering element again satisfy the rules for activation pursuant to the Pre-established Predictive Activation Model;

the occupant of the seating assembly manually deactivating the temperature altering element via the user interface;

upon the occupant manually deactivating the temperature altering element via the user interface, recalibrating the Pre-established Predictive Activation Model into a new predictive activation model accounting for the collected data relative to the Certain Identifiable Conditions existing when the occupant manually deactivated the temperature altering element and establishing new rules for activation and/or deactivation of the temperature altering element;

the occupant manually activating the temperature altering element via the user interface;

upon the occupant manually activating the temperature altering element via the user interface, recalibrating the new predictive activation model into a newer predictive activation model accounting for the collected data relative to the Certain Identifiable Conditions existing when the occupant manually activated the temperature altering element and establishing new rules for activation and/or deactivation of the temperature altering element;

the temperature altering element being adjustable to several different levels of temperature altering;

the controller further including a Pre-established Predictive Level Model establishing rules governing which level of the several different levels of temperature altering the controller will initially automatically set for the temperature altering element, the rules of the Pre-established Predictive Level Model being a function of one or more of the Certain Identifiable Conditions;

the user interface further configured to allow the occupant to select manually the level of the several different levels of temperature altering;

determining, by comparing the collected data to the rules of the Pre-established Predictive Level Model, which level of the several different levels of temperature altering the controller will initially automatically set for the temperature altering element;

initially automatically setting the temperature altering element to the determined level;

the Pre-established Predictive Level Model is formed pursuant to a multilayer perceptron classifier analysis of input data relating to the Certain Identifiable Conditions collected from other vehicles;

the occupant of the seating assembly manually changing the level of temperature altering for the temperature altering element via the user interface;

upon the occupant manually changing the level of temperature altering for the temperature altering element via the user interface, recalibrating the Pre-established Predictive Level Model into a new predictive level model accounting for the collected data relative to the Certain Identifiable Conditions existing when the occupant manually changed the level of temperature altering and establishing new rules governing the level of temperature altering for the temperature altering element when the temperature altering element is automatically activated;

automatically deactivating the temperature altering element;

automatically reactivating the temperature altering element;

determining, by comparing the collected data to the rules of the new predictive level model, which level of the several different levels of temperature altering the controller will initially automatically set for the temperature altering element;

automatically setting the temperature altering element to the determined level;

removing the occupant from the seating assembly;

occupying the seating assembly with a second occupant;

recognizing that the second occupant is different than the occupant;

collecting data relative to the identifiable conditions while the second occupant is occupying the seating assembly;

determining, by comparing the only the data collected while the second occupant is occupying the seating assembly, and not the data collected with the occupant was occupying the seating assembly, to the rules of the Pre-established Predictive Activation Model, whether data collected satisfy the rules of the Pre-established Predictive Activation Model so as to initially automatically activate the temperature altering element; and initially automatically activating the temperature altering element while the second occupant is occupying the seating assembly.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
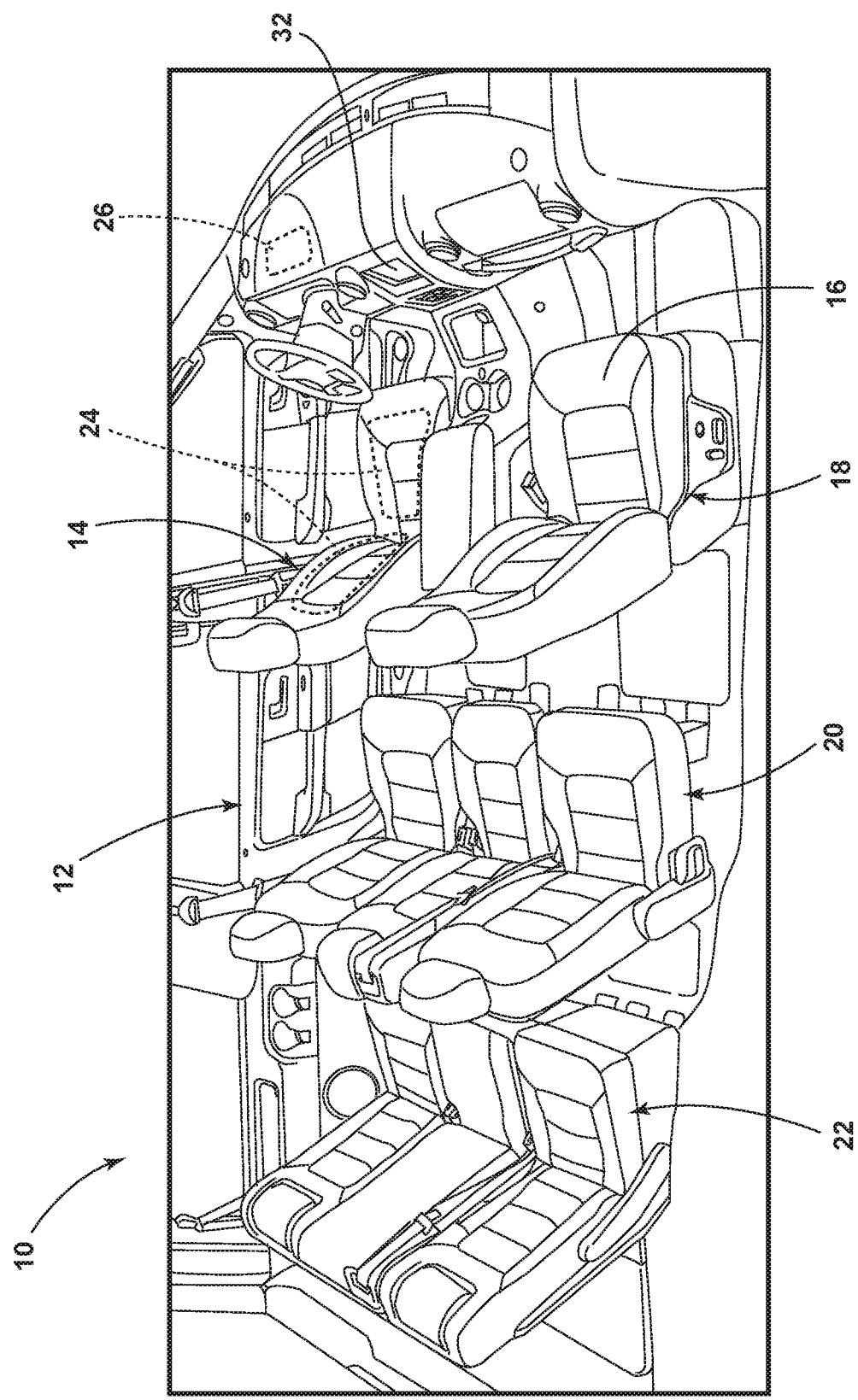
FIG. 1 is a side overhead view of an interior of a vehicle, illustrating a first seating assembly that includes a temperature altering element to provide selective heating or cooling, a controller, and a user interface.

For purposes of description herein, the term "rearward" shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, a vehicle 10 includes an interior 12. A first seating assembly 14 and a second seating assembly 16 are disposed in the interior 12 and form a first row of seating 18. The vehicle 10 can further include a second row of seating 20 disposed rearward for the first row of seating 18, a third row of seating 22 disposed rearward of the second row of seating 20, and so on. The first seating assembly 14 can be designated for an occupant who operates the vehicle 10. The second seating assembly 16 can be designated for an occupant who is a passenger of the vehicle 10. As the second seating assembly 16, the second row of seating 20, and third row of seating 22, can be identical to the first seating assembly 14 for purposes of this disclosure, only the first seating assembly 14 will be particularly discussed herein.

The first seating assembly 14 includes a temperature altering element 24. The temperature altering element 24 can be any element that increases or decreases the temperature of the first seating assembly 14 upon command. The temperature altering element 24 can be a heating mechanism for imparting heat such as wires resisting electrical current and producing heat, a cooling mechanism that removes heat (i.e., imparts cooling) such as cooled air, or a Peltier thermoelectric device that is able to produce either cooling or heating. The first seating assembly 14 can include a temperature altering element 24 dedicated to heating and another temperature altering element 24 dedicated to cooling. The temperature altering element 24 can be adjustable to provide several different levels of temperature altering. For example, the temperature altering element 24 can provide temperature altering of comparatively high, medium, or low levels.

Figure 2:
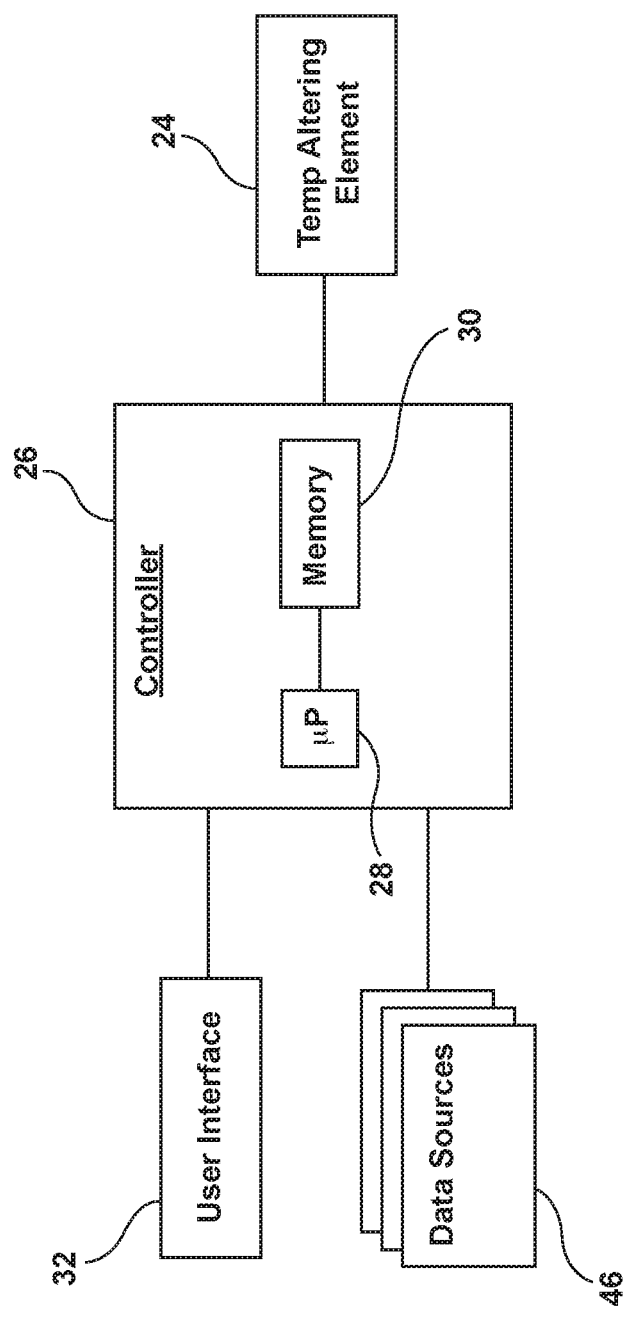
FIG. 2 is a schematic diagram of the controller of FIG. 1, illustrating that the controller accepts input from various data sources and the user interface and uses these input sources to automatically control the activation/deactivation of the temperature altering element and the level at which the temperature altering element is altering temperature.

Referring now also to FIG. 2, the vehicle 10 further includes a controller 26. The controller 26 is in communication with the temperature altering element 24. The controller 26 controls whether the temperature altering element 24 is activated (i.e., providing heat or providing cooling) and how aggressively (i.e., what level, such as high, medium, or low) the temperature altering element 24 is altering temperature. The controller 26 can include a microprocessor 28 to execute programs, such as those used to control the temperature altering element 24, stored in memory 30.

The controller 26 includes a Pre-established Predictive Activation Model for heating and/or a Pre-established Predictive Activation Model for cooling establishing rules that govern whether the controller 26 will initially automatically activate the temperature altering element 24 to impart heat or impart cooling, respectively, to the first seating assembly 14 without the input or instruction of the occupant of the first seating assembly 14. The Pre-established Predictive Activation Model(s) can be stored in the memory 30. The Pre-established Predictive Activation Models are formed as a consequence of analyzing data collected from occupants of seating assemblies of other vehicles (hereinafter, "Test Vehicles"). The general analysis concerns the question of what conditions existed when occupants of seating assemblies of the Test Vehicles activated the temperature altering element of those seating assemblies to impart heat and to impart cooling. The identification of those conditions can be utilized to predict when the occupant of the first seating assembly 14 would desire to have the temperature altering element 24 of the first seating assembly 14 activated to impart heat (or to impart cooling) and then automatically activate the temperature altering element 24 to do so without the occupant manually instructing the controller 26 to activate the temperature altering element 24. In other words, the Pre-established Predictive Activation Model is formed pursuant to an analysis of input data collected from the Test Vehicles relating to numerous conditions (hereinafter, "Certain Identifiable Conditions"). The Pre-established Predictive Activation Model is a function of those Certain Identifiable Conditions. The Pre-established Predictive Activation Model and the Certain Identifiable Conditions are discussed in greater detail below.

The controller 26 further includes a Pre-established Predictive Level Model for heating and/or a Pre-established Predictive Level Model for cooling stored in memory 30. The Pre-established Predictive Level Models establish rules governing which level of the several different levels of temperature altering the controller 26 will initially automatically set for the temperature altering element 24. For example, the Pre-established Predictive Level Model for heating establishes rules governing which level of heating (i.e., how aggressive of heating) the controller 26 will automatically set for the temperature altering element 24 when and while the controller 26 automatically activates the temperature altering element 24 to impart heat. Likewise, the Pre-established Predictive Level Model for cooling establishes rules governing which level of cooling (i.e., how aggressive of cooling) the controller 26 will automatically set for the temperature altering element 24 when and while the controller 26 automatically activates the temperature altering element 24 to impart cooling. The rules of the Pre-established Predictive Level Model(s) are a function of the Certain Identifiable Conditions. The Pre-established Predictive Level Model likewise will be discussed further below.

The controller 26 receives input from one or more data sources 46 within the vehicle 10 concerning the Certain Identifiable Conditions. The one or more data sources 46 can be sensors and/or settings, among other things. As discussed further below, the controller 26 utilizes data concerning the Certain Identifiable Conditions to control the temperature altering element 24 according to the Pre-established Predictive Model and the second Pre-established Predictive Model (and subsequent refinements thereof).

Figure 3A:
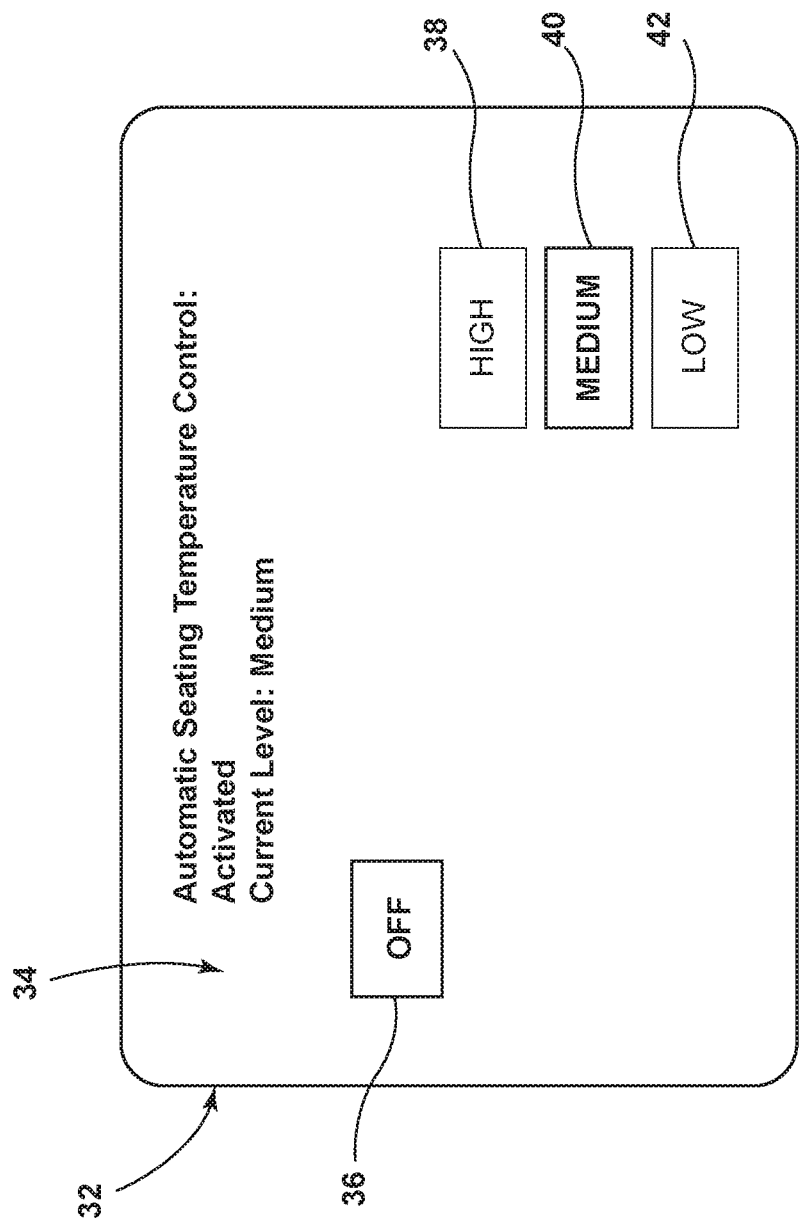
FIG. 3A is a front view of an exemplary user interface of FIG. 1, illustrating a touch screen display providing notification that the controller has automatically activated the temperature altering element and the level of temperature altering, and providing a touchable "OFF" button allowing an occupant of the first seating assembly to manually deactivate the temperature altering element.
Figure 3B:
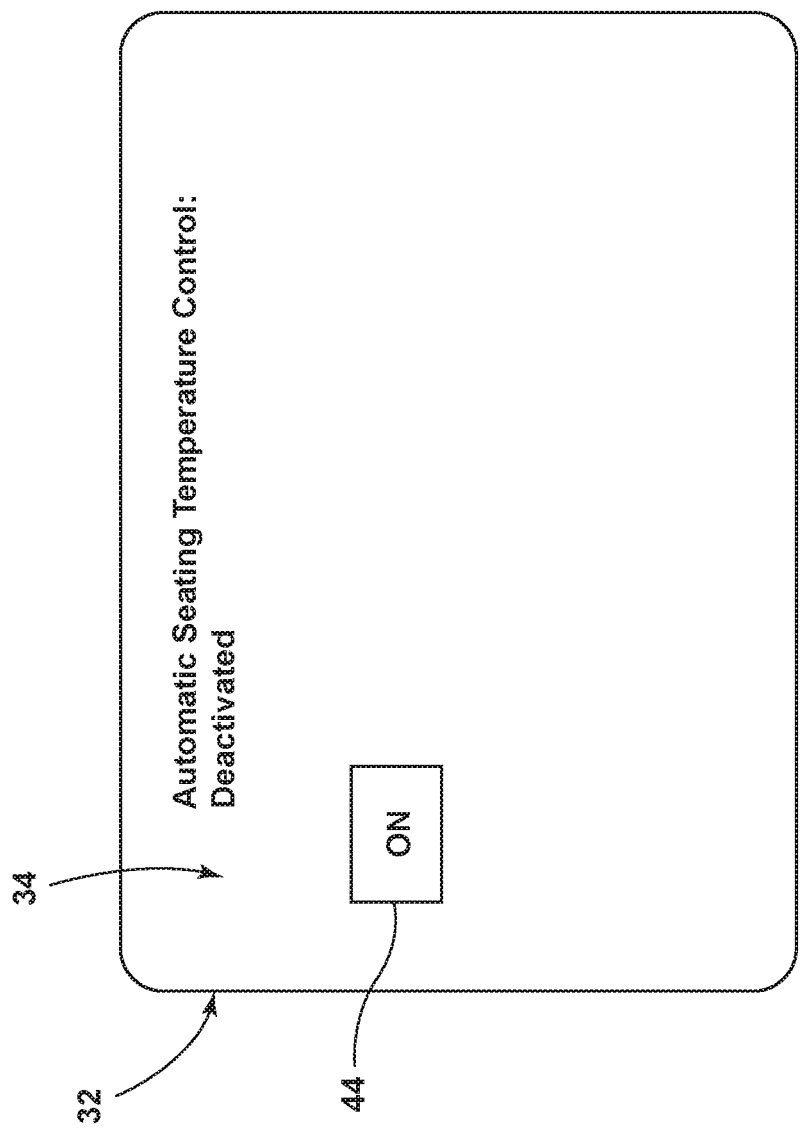
FIG. 3B is a front view of the exemplary user interface of FIG. 1, illustrating the touch screen display providing notification that the controller has not automatically activated the temperature altering element and providing a touchable "ON" button allowing the occupant of the first seating assembly to manually activate the temperature altering element.

Referring now also to FIGS. 3A and 3B, the vehicle 10 further includes a user interface 32 in communication with the controller 26. The user interface 32 can be located in the vehicle 10 such that the occupant of the first seating assembly 14 can interact with the user interface 32. For example, the user interface 32 can be a touch screen display 34, a knob, switch, and/or a voice-manipulable user interface, among other things. The user interface 32 is configured to allow the occupant to manually activate the temperature altering element 24 if the controller 26 has not activated the temperature altering element 24 to impart heating or cooling as the occupant desires. In addition, the user interface 32 is configured to manually deactivate the temperature altering element 24 if the controller 26 has activated the temperature altering element 24 to impart heating or cooling contrary to the occupant's desires. For example, the user interface 32 could be the touch screen display 34 with an option (e.g., a button 36 labeled "OFF") allowing the occupant of the first seating assembly 14 to deactivate the temperature altering element 24 of the first seating assembly 14 that the controller 26 has automatically activated according to the Pre-established Predictive Activation Model to impart heat. If the occupant presses the OFF button 36, the controller 26 accepts the interaction as input and deactivates the temperature altering element 24 from imparting heat. The previous scenario could likewise apply if the controller 26 has automatically activated the temperature altering element 24 pursuant to Pre-established Predictive Activation Model to impart cooling. Similarly, the touch screen display 34 can include an option (e.g., a button 44 labeled "ON") allowing the occupant of the first seating assembly 14 to activate the temperature altering element 24 of the first seating assembly 14 that the controller 26 has not automatically activated following the Pre-established Predictive Activation Model(s). If the occupant presses the button 44 labeled "ON," the controller 26 accepts the interaction as input and activates the temperature altering element 24. For example, if the occupant desires the temperature altering element 24 to impart heat to the first seating assembly 14 but the controller 26 has not automatically caused the temperature altering element 24 to do so pursuant to the Pre-established Predictive Activation Model for cooling, then the occupant could navigate to the touch screen display 34 to a cooling option screen and press the button 44 labeled "ON," and the controller 26 then activates the temperature altering element 24 to impart cooling.

In addition, the user interface 32 is configured to allow the occupant of the first seating assembly 14 to manually select the level of the several different levels of temperature altering. For example, the touch screen display 34 can have an option allowing the occupant of the first seating assembly 14 to manually select a relatively high level of temperature altering (e.g., a button 38 labeled "HIGH"), a relatively low level of temperature altering (e.g., a button 42 labeled "LOW"), or a level of temperature altering between high and low levels (e.g., a button 40 labeled "MEDIUM"). The touch screen display options might be "3," "2," and "1" instead of "HIGH," "MEDIUM," and "LOW," respectively. If the occupant presses one of the buttons 38, 40, 42, the controller 26 accepts the interaction as input and adjusts the level of the temperature altering element 24 accordingly, overriding the level at which the controller 26 automatically set for the temperature altering element 24 pursuant to the Pre-established Predictive Level Model. The occupant's interaction with the user interface 32 in this manner to override the controller's 26 automatic control of the temperature altering element 24 affects the controller's 26 subsequent automatic control thereof, as discussed in greater detail below.

Figure 4:
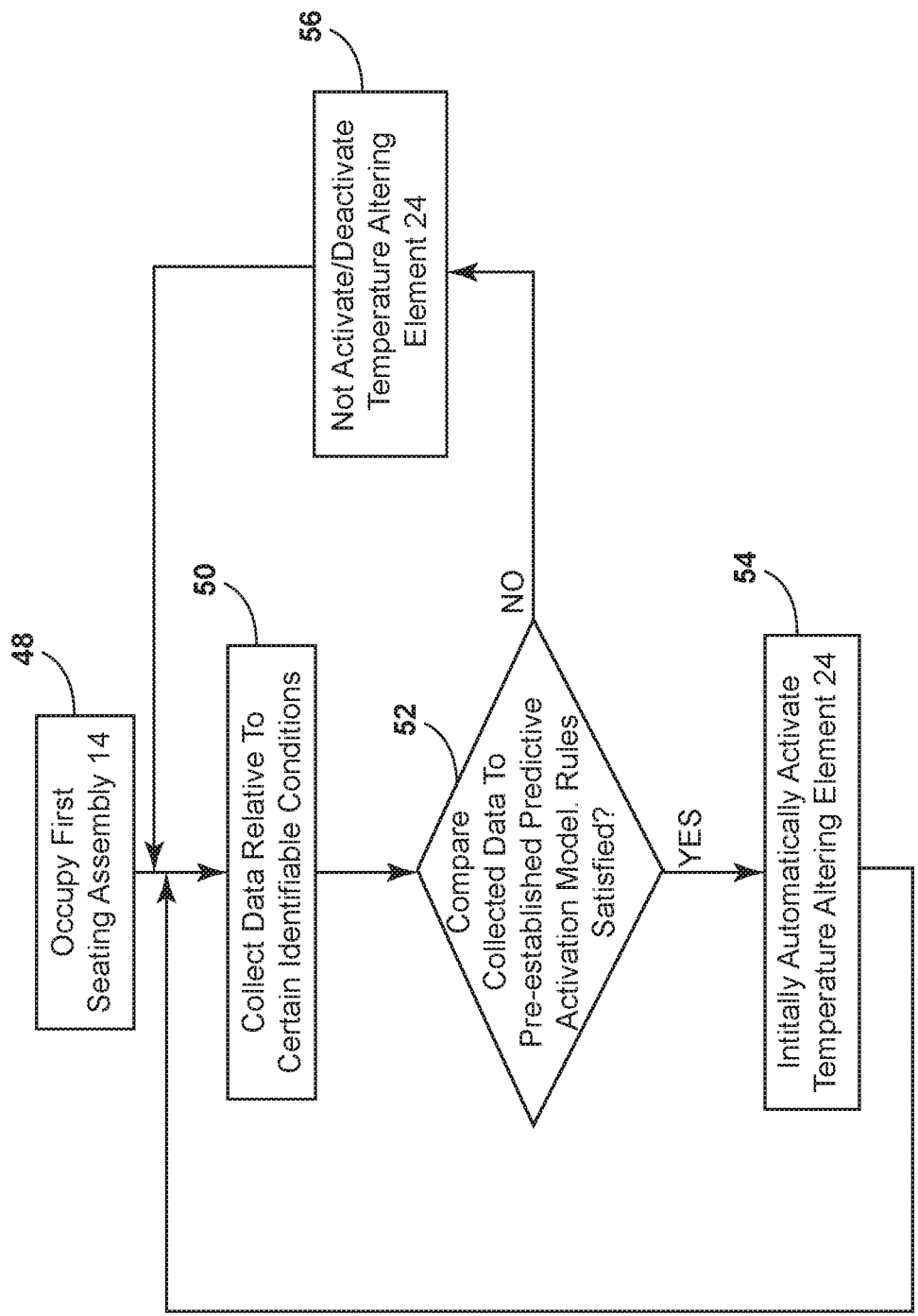
FIG. 4 is a process diagram illustrating the controller, after the occupant occupies the first seating assembly, collecting (accepting as input) data from the various data sources relating to Certain Identifiable Conditions, comparing the data to rules established by a Pre-established Predictive Activation Model governing the activation and deactivation of the temperature altering element, and either activating the temperature altering element or not activating/deactivating the temperature altering element according to the rules.

Referring now to FIG. 4, the above vehicle 10, including the first seating assembly 14 with the temperature altering element 24, the controller 26, and the user interface 32 can be utilized in performing a novel method of controlling the temperature altering element 24. The novel method (at step 48) includes occupying the first seating assembly 14 with an occupant, (at step 50) collecting data relating to the Certain Identifiable Conditions (from data sources 46) while the occupant is occupying the first seating assembly 14, (at step 52) determining (by comparing the collected data to the rules of the Pre-established Predictive Activation Model governing activation) whether the collected data satisfies the rules of the Pre-established Predictive Activation Model so as to initially automatically activate the temperature altering element 24, and, if so, (at step 54) initially automatically activating the temperature altering element 24. If comparing the collected data to the Pre-established Predictive Activation Model reveals that the rules for activation of the temperature altering element 24 are not satisfied, then the method can proceed back to step 50 and the data collection continues. Even if the collected data satisfies the rules of the Pre-established Predictive Activation Model for activation of the temperature altering element 24, the method can further include proceeding back to step 50 to continue data collection and subsequently to determine whether the collected data satisfies the rules of the Pre-established Predictive Activation Model for deactivation of the temperature altering element 24, is no longer satisfied, resulting in deactivation of the temperature altering element 24 at step 56.

We now further discuss the Test Vehicles and the data collected therefrom relating to the Certain Identifiable Conditions, analysis of which data forms the pre Pre-established Predictive Activation Model(s) and the Pre-established Predictive Level Model(s) (and subsequent iterations thereof). Data was collected from over 700 Test Vehicles. The data was narrowed down to data related to less than sixty conditions forming the Certain Identifiable Conditions, which were thought to have some relation to the decision of occupants whether to activate the temperature altering element 24 and at what level (how aggressive) the temperature altering element 24 would alter temperature. Those Certain Identifiable Conditions include: whether automatic windshield wipers have been activated, i.e., are wiping, because of sensed rain or otherwise ("Smart_Wiper_Motor_Stat"); front passenger side temperature set point ("Front_Rt_Temp_Setpt"); front operator side temperature set point ("Front_Left_Temp_Setpt") (these last two temperature set points refer to the set point temperature of the blown air directed toward the first seating assembly 14 and the second seating assembly 16, respectively); whether a rear window defrost has been activated ("Overriding_ModeReq," "Rear_Defrost_Soft_Bttn_Stt"); level at which the vehicle's climate control system is blowing air ("Front_Rear_Blower_Req"); outside/ambient temperature ("AirAmb_Te_ActlFilt," "AirAmb_Te_ActlFilt_UB," "AirAmb_Te_Actl," "AirAmb_Te_Actl_UB"); the temperature of the interior of the vehicle ("InCarTemp," "InCarTempQF"); engine speed (such as revolutions per minute) ("EngAout_N_Actl," "EngAout_N_Actl_UB"); whether the operator has activated an interior air recirculation function ("Recirc_Request"); and the time of the day, which may be expressed as the hour of the day ("hour"). Other of the Certain Identifiable Conditions include: whether the operator has requested that the steering wheel be heated ("CC_HtdStrWhl_Req_Binary," "CC_HtdStrWhl_Req"); whether the operator has activated a front window defrost function ("Front_Defrost_Sft_Btn_Stt"); whether air conditioning has been activated ("AC_Request"); vehicle 10 speed ("Veh_V_ActlEng_UB," "Veh_V_ActlEng"); whether the passenger has activated a temperature altering element 24 for the second seating assembly 16, the passenger seating assembly, ("Pass_Fr_Cond_Seat_Req"; and, if so, what level ("Pass_Fr_Cond_Seat_Lvl"). Still other Certain Identifiable Conditions can include: the status of defrost controls generally ("Default_Defrost_State"); whether the operator has activated a function to defrost the side rearview mirrors ("RrDefrost_HtdMirrReq"); the status of the defrosting of the side rearview mirrors ("RrDefrost_HtdMirrState"); whether the operator has manually overridden an automatic defrost function of the side rearview mirrors ("Mirror_Manual_Override"); positioning of the passenger mirrors horizontally and vertically ("Pass_Mirror_Sw_UD_Stat" and "Pass_Mirror_Sw_LR_Stat"); whether a passenger in the second row of seating 20, passenger side, has activated a temperature altering element ("Pass_Rr_Cond_Seat_Req") and if so what level ("Pass_Rr_Cond_Seat_Lvl"); whether a passenger in the second row of seating 20, driver side, has activated a temperature altering element ("Drvr_Rr_Cond_Seat_Req"). Still other Certain Identifiable Conditions relate to time can include minute, second, date, and day of the week (Monday, Tuesday, etc.), and season. Still other Certain Identifiable Conditions include sunlight level, and trip-related statistics, such as trip length, trip frequency, trip characterization (such as commute versus leisure), GPS positioning (such as latitude and longitude), road grade, altitude, city versus country driving, highway versus city road, torque, braking, and idle time.

The identifiers above noted in quotations within parentheses are provided to help decipher the example Pre-established Predictive Activation Models reproduced below. Several identifiers may relate to the same concept. For example, "AirAmb_Te_ActlFilt," "AirAmb_Te_ActlFilt_UB," "AirAmb_Te_Actl," and "AirAmb_Te_Actl_UB" all relate to the temperature of the ambient air. Before analyzing the data relating to the Certain Identifiable Conditions to generate the Pre-established Predictive Activation Model(s) and the Pre-established Predictive Level Model(s), it may be advantageous to consolidate the several identifiers into one identifier. For example, data with the identifier "AirAmb_Te_Act_UB" may essentially be duplication of "AirAmb_Te_Act" and may be removed entirely from the data before analyzing to generate the Pre-established Predictive Activation Model(s) and the Pre-established Predictive Level Model(s). As another example, "AirAmb_Te_ActlFilt" may be a version of "AirAmb_Te_Act" to filter out short term fluctuations in the data with the "AirAmb_Te_Act" identifier. Therefore, only data with the "AirAmb_Te_Act" can be included for the analysis to generate the Pre-established Predictive Activation Model(s) and the Pre-established Predictive Level Model(s).

In general, by analyzing data related to the Certain Identifiable Conditions from the Test Vehicles, it can be determined what the Certain Identifiable Conditions were when an occupant of a Test Vehicle made the decision to activate the temperature altering element 24 (both for heating and for cooling of the first seating assembly 14) and made the decision to deactivate the temperature altering element 24. The Pre-established Predictive Activation Model(s) and the Pre-established Predictive Level Model(s) can then be formed, establishing rules as a function of the data related to the Certain Identifiable Conditions that satisfied a certain percentage of instances when the occupants of the Test Vehicles made the decision to activate/deactivate the temperature altering element 24. In other words, by modeling past occupant behavior demonstrated in the Test Vehicles, the Pre-established Predictive Activation Model(s) and the Pre-established Predictive Level Model(s) can be used to predict future occupant desires in the vehicle 10 regarding activation/deactivation of temperature altering element 24 (and level of temperature altering) and automatically control the activation/deactivation and level management thereof.

Some of the data can be processed before analyzing the data to generate the Pre-established Predictive Activation Model(s) and the Pre-established Predictive Level Model(s). For example, data related to the Certain Identifiable Condition of whether automatic windshield wipers are activated because of sensed rain can be processed to reflect simply the wiper status as on or off (and assigned a 1 value or a 0 value) ("Smart_Wiper_Motor_Stat_V1") rather than initial data that includes a number between 0 and 1 to reflect speed of the wipers ("Smart_Wiper_Motor_Stat"). Data related to other of the Certain Identifiable Conditions can be processed in the same way to make the data more meaningfully predictive for the Pre-established Predictive Activation Model(s) and the Pre-established Predictive Level Model(s). As another example, some of the Certain Identifiable Conditions can be derived from other Certain Identifiable Conditions and further analyzed for predictive power for the Pre-established Predictive Activation Model(s) and the Pre-established Predictive Level Model(s). For example, a Certain Identifiable Condition of whether the occupant has requested the vehicle 10 to heat the interior 12 with low, medium, or high blower speed when activating the temperature altering element 24 ("turnOnHeat1," "turnOnHeat2," "turnOnHeat3") was derived from the Certain Identifiable Conditions of the operator side temperature setting ("Front_Left_Temp_Setpt") and the level at which the vehicle's climate control system is blowing air ("Front_Rear_Blower_Req," "RCCM_Fr_Rr_Blower_Req"). As another example, the Certain Identifiable Conditions of the ambient temperature ("AirAmb_Te_Actl") and the in-vehicle 10 temperature ("InCarTemp") can be used to calculate the temperature differential between the two temperatures ("tempDiff"). As another example, the Certain Identifiable Condition of the hour of the day ("hour") can be segmented, such as into whether it is morning ("isMorning"). As yet another example, the Certain Identifiable Condition of the hour of the day ("hour") or another time related Certain Identifiable Condition can be segmented into the month ("month") or season, such as whether it is spring, summer, fall, or winter ("isSummerx").

The Pre-established Predictive Activation Model(s) and the Pre-established Predictive Level Model(s) can be derived from the data related to the Certain Identifiable Conditions that were collected from the Test Vehicles en masse. Alternatively, the data related to the Certain Identifiable Conditions collected from the Test Vehicles can be first segmented (such as into 3 segments, hereinafter "Segments") based on criteria such as operator type (such as a primarily city driver, a primarily highway driver, an "aggressive" operator). Separate Pre-established Predictive Activation Model(s) and the Pre-established Predictive Level Model(s) for each Segment, that is, for each operator type. The assumption is that one type of operator will exhibit different patterns of activation the temperature altering element 24 than another type of operator. For example, one Pre-established Predictive Activation Model for heating can be derived for one type of operator and another Pre-established Predictive Activation Model for heating can be derived for another type of operator, and so on. Criteria that can be utilized to segment the data collected from the over 700 vehicles include average trip length for each of the Test Vehicles, the standard deviation of the trip length, the average number of trips per unit of time such as per day, the number of trips that might be considered "short," such as under two miles, the amount of highway miles the Test Vehicle has been driven, the amount of non-highway miles the vehicle has been driven, and the ratio between the latter two. Other criteria that can be utilized to segment the data collected from the Test Vehicles further include those that can relate to how "aggressive" the particular Test Vehicle has been driven, such as torque, load, vehicle speed, engine revolutions per minute, fuel economy, how often the driver coasted (that is, how often the vehicle moved without the operator either causing the vehicle to accelerate or decelerate through braking). The segmentation of the data collected from the Test Vehicles to form the Segments can be performed through a k-means cluster algorithm.

The controller 26 can initially include Pre-established Predictive Activation Model(s) and the Pre-established Predictive Level Model(s) generated from each Segment but, as a default, utilize only the Pre-established Predictive Activation Model(s) and the Pre-established Predictive Level Model(s) for one particular Segment for the activation/deactivation of the temperature altering element 24 (and level control). Data can then be collected relating to the Certain Identifiable Conditions while the vehicle 10 begins operation for a certain period of time. This data can then be compared to the Segments to determine to which of the Segments the vehicle 10 is most similar. For example, one of the Segments might be data from the subset of the Test Vehicles that were mainly driven on highways and the vehicle 10 might be mainly driven on highways as well. The Pre-established Predictive Activation Model(s) and the Pre-established Predictive Level Model(s) derived from that particular Segment can then be the Pre-established Predictive Activation Model(s) and the Pre-established Predictive Level Model(s) utilized by the controller 26 thereafter.

The Pre-established Predictive Activation Model(s) can be formed pursuant to a classification and regression tree ("CART") analysis of the data related to the Certain Identifiable Conditions collected from the Test Vehicles en masse or Segmented (resulting in Pre-established Predictive Activation Model(s) for each Segment), as explained above. There are a variety of CART analyses that can provide useful results, including the C.50 program (Release 2.07 GPL Edition, available from www.rulequest.com), the M5P classifier, as implemented in Weka (available from http://weka.sourceforge.net/doc.stable/weka/classifiers/trees/M5P.html), and the Random Tree classifier, as implemented in Weka (available from http://weka.sourceforge.net/doc.dev/weka/classifiers/trees/RandomTree.html) There are other CART analyses available and this in not meant to be an exhaustive list.

An example Pre-established Predictive Activation Model for heating formed pursuant to the C.50 program CART analysis is set forth below. This example Pre-established Predictive Activation Model sets forth the rules of the activation/deactivation of temperature altering element 24 to impart heating to the first seating assembly 14 as a function of data relating to the Certain Identifiable Conditions.

```
AirAmb_Te_Actl > 12.17466:
:...Front_Rt_Temp_Setpt <= 154.9836: 0 (288)
:   Front_Rt_Temp_Setpt > 154.9836: 1 (18/1)
AirAmb_Te_Actl <= 12.17466:
:...isMorning <= 0: 0 (120)
   isMorning > 0:
   :...turnOnHeat3 <= 0:
       :...tempDiff <= 3.670543: 0 (112)
       :   tempDiff > 3.670543: 1 (9/1)
       turnOnHeat3 > 0:
       :...Front_Left_Temp_Setpt > 152: 0 (21)
           Front_Left_Temp_Setpt <= 152:
           :...AirAmb_Te_Actl <=5.594171:
               :...AirAmb_Te_ActlFilt <= -2.632576: 1 (6)
               :   AirAmb_Te_ActlFilt > -2.632576: 0 (45)
               AirAmb_Te_Actl > 5.594171:
               :...InCarTemp > 26.7017: 1 (25)
                   InCarTemp <= 26.7017:
                   :...InCarTemp <= 24.46211:
                       :...InCarTemp <= 18.35714: 0 (7/1)
                       :   InCarTemp > 18.35714: 1 (44/3)
                       InCarTemp > 24.46211:
                       :...AirAmb_Te_ActlFilt <= 5.649194: 1 (10/2)
                           AirAmb_Te_ActlFilt > 5.649194: 0 (23)
```

Those skilled in the art will understand how to decipher the above Pre-Established Predicative Activation Model. Each line includes an identifier related to a specific Certain Identifiable Condition. For example, the first line "AirAmb_Te_Actl>12.17466:" includes the identifier "AirAmb_Te_Actl," which as set forth above means ambient temperature. Each line includes a value related to the preceding Certain Identifiable Condition. For example, the first line "AirAmb_Te_Actl>12.17466:" includes the value "12.17466," which means 12.17466 degrees Celsius. Each line includes a conditional statement. For example, the first line "AirAmb_Te_Actl>12.17466:" can be read to mean "if the ambient temperature is greater than 12.17466 and." The reading would then proceed to the second and third lines, which are indented and otherwise identified as subservient to the first line. The second line includes an identifier and value as before and further includes a conclusion denoted by "0" following the colon ":". The "0" signifies deactivation/non-activation of the temperature altering element 24 to impart heating. In contrast, the third line includes ":1" signifying activation of the temperature altering element 24 to impart heating. (The values for front passenger side temperature set point ("Front_Rt_Temp_Setpt") and front operator side temperature set point ("Front_Left_Temp_Setpt") used herein are without units, with a range between 119 and 171. That range linearly correlates with 60 degrees F. and 85 degrees F., respectively. Thus, the value in the second line "Front_Rt_Temp_Setpt<=154.9836" would roughly equate to 77.3 degrees Fahrenheit.) Therefore, the first, second, and third lines together

```
AirAmb_Te_Actl > 12.17466:
:...Front_Rt_Temp_Setpt <= 154.9836: 0 (288)
:          Front_Rt_Temp_Setpt > 154.9836: 1 (18/1)
``` can be read as: If the ambient temperature is greater than 12.17466 degrees Celsius and the front passenger side set point temperature is less than or equal to 154.9836 (77.3 degrees Fahrenheit), then the temperature altering element 24 is not activated to impart heating (or deactivated if it is already imparting heat); but if the ambient temperature is greater than 12.17466 degrees Celsius and the front passenger side set point temperature is greater than 154.9836 (77.3 degrees Fahrenheit), then the temperature altering element 24 is activated to impart heat.

The above example is a relatively simple Pre-Established Predicative Activation Model for heating, because the Pre-Established Predicative Activation Model established rules that are a function of only several of the Certain Identifiable Conditions, namely the ambient temperature ("AirAmb_Te_Actl" and "AirAmb_Te_ActlFilt"), the front passenger side temperature set point ("Front_Rt_Temp_Setpt"), the hour of the day segmented into whether it is morning ("isMorning"), the in-vehicle temperature ("InCarTemp"), the temperature differential between the ambient temperature and the in-vehicle temperature ("tempDiff"), whether the occupant has requested the vehicle to heat the interior with high blower speed ("turnOnHeat3"), and the front operator side temperature set point ("Front_Left_Temp_Setpt").

Figure 5:
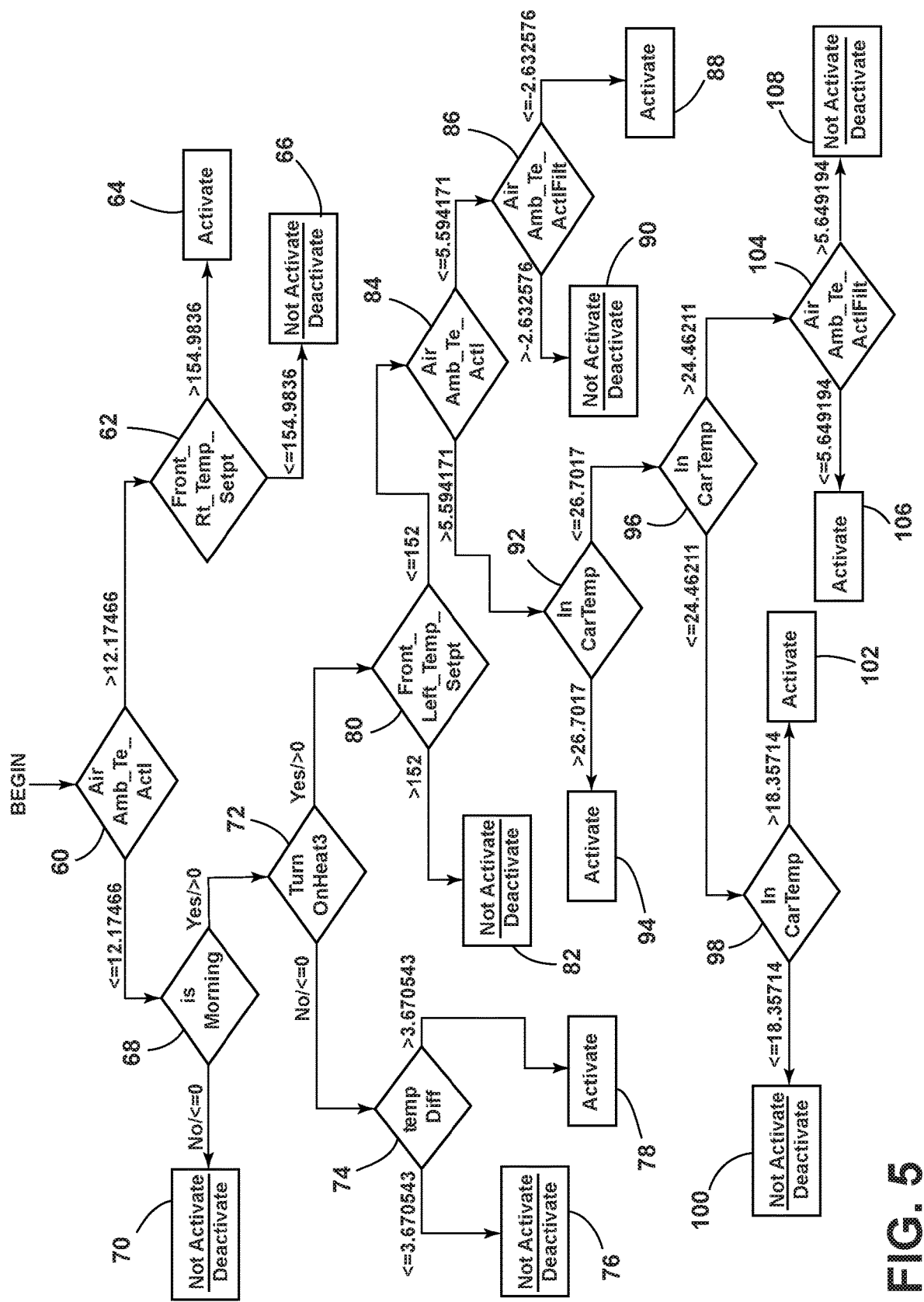
FIG. 5 is a schematic diagram illustrating the rules of a first example Pre-established Predictive Activation Model (for heating) providing the data relating to the Certain Identifiable Conditions that must exist for the controller to automatically activate the temperature altering element to impart heat and to not activate/automatically deactivate the temperature altering element.

More specifically, referring now to FIG. 5, at step 60, the controller 26 determines whether the ambient temperature is greater than 12.17466 degrees Celsius, or less than or equal to 12.17466 degrees Celsius. If the controller 26 determines that the ambient temperature is greater than 12.17466 degrees Celsius ("AirAmb_Te_Actl>12.17466"), then, at step 62, the controller 26 determines whether the front passenger side temperature set point ("Front_Rt_Temp_Setpt") is greater than a certain temperature ("Front_Rt_Temp_Setpt>154.9836"), or less than or equal to the certain temperature ("Front_Rt_Temp_Setpt<=154.9836"). If the controller 26 determines that the front passenger side temperature set point ("Front_Rt_Temp_Setpt") is greater than a certain temperature ("Front_Rt_Temp_Setpt>154.9836"), then at step 64, the controller 26 activates the temperature altering element 24 to impart heat. In contrast, if the controller 26 determines that the front passenger side temperature set point ("Front_Rt_Temp_Setpt") is less than or equal to the certain temperature ("Front_Rt_Temp_Setpt<=154.9836"), then at step 66, the controller 26 does not activate the temperature altering element 24 to impart heat or, if the controller 26 had already activated the temperature altering element 24 to impart heat, deactivates the temperature altering element 24. In other words, when the ambient temperature is greater than the certain temperature ("AirAmb_Te_Actl>12.17466"), the Pre-established Predictive Model, at steps 62 and 64, would initially automatically activate the temperature altering element 24 as a function of the front passenger side temperature set point ("Front_Rt_Temp_Setpt").

If instead the controller 26 determines at step 60 that the ambient temperature is less than or equal to the certain temperature ("AirAmb_Te_Actl<=12.17466"), the controller 26 then first determines, at step 68, the hour of the day segmented into whether it is morning ("isMorning"). At step 68, if the controller 26 determines that it is not a morning hour ("isMorning<=0"), then the controller 26, at step 70, does not activate the temperature altering element 24 to impart heat or, if the controller 26 had already activated the temperature altering element 24 to impart heat, deactivates the temperature altering element 24. In contrast, at step 68, if the controller 26 determines that it is a morning hour ("isMorning>0"), then the controller 26 proceeds to step 72, where the controller 26 determines whether the occupant has requested the vehicle 10 to heat the interior 12 with high blower speed ("turnOnHeat3"). If, at step 72, the controller 26 determines that the occupant has not requested the vehicle 10 to heat the interior 12 with high blower speed ("turnOnHeat3<=0"), then the controller 26 determines, at step 74, whether the temperature differential between the ambient temperature and the in-vehicle 10 temperature ("tempDiff") is greater or less than a certain amount. If, at step 74, the controller 26 determines that the temperature differential between the ambient temperature and the in-vehicle 10 temperature is less than or equal to a certain amount ("tempDiff<=3.670543") (3.67 degrees Celsius), then the controller 26, at step 76, does not activate the temperature altering element 24 to produce heat or, if the controller 26 had already activated the temperature altering element 24 to produce heat, deactivates the temperature altering element 24. However, if, at step 74, the controller 26 determines that the temperature differential between the ambient temperature and the in-vehicle 10 temperature is greater than the certain amount ("tempDiff>3.670543"), then the controller 26, at step 78, activates the temperature altering element 24 to produce heat.

If, at step 72, the controller 26 determines that the occupant has requested the vehicle 10 to heat the interior 12 with high blower speed ("turnOnHeat3>0"), then the controller 26 determines, at step 80, whether the front operator side temperature set point ("Front_Left_Temp_Setpt") is greater or less than a certain amount. If, at step 80, the controller 26 determines that the front operator side temperature set point is greater than a certain temperature ("Front_Left_Temp_Setpt>152"), then the controller 26, at step 82, does not activate the temperature altering element 24 to produce heat or, if the controller 26 had already activated the temperature altering element 24 to produce heat, deactivates the temperature altering element 24. However, if the controller 26, at step 80, determines that the front operator side temperature set point is less than or equal to the certain temperature ("Front_Left_Temp_Setpt<=152"), then the controller 26 proceeds to step 84. At step 84, the controller 26 determines whether the ambient temperature ("AirAmb_Te_Actl") is greater or less than a certain temperature. If, at step 84, the controller 26 determines that the ambient temperature is less than or equal to a certain temperature ("AirAmb_Te_Actl<=5.594171"), then the controller 26 proceeds to step 86. At step 86, the controller 26 again determines whether the ambient temperature ("AirAmb_Te_ActlFilt") is greater or less than a certain temperature. If the controller 26 determines, at step 86, that the ambient temperature is less than or equal to the certain temperature ("AirAmb_Te_ActlFilt<=−2.632576"), then the controller 26, at step 88, activates the temperature altering element 24 to produce heat. However, if the controller 26 determines at step 86 that the ambient temperature is greater than the certain temperature ("AirAmb_Te_ActlFilt>−2.632576"), then the controller 26, at step 90, does not activate the temperature altering element 24 to produce heat or, if the controller 26 had already activated the temperature altering element 24 to produce heat, deactivates the temperature altering element 24.

Returning back to step 84, if the controller 26 determines that the ambient temperature is greater than the certain temperature ("AirAmb_Te_Actl>5.594171"), then the controller 26 proceeds to step 92. At step 92, the controller 26 determines whether the in-vehicle 10 temperature ("InCarTemp") is greater or less than a certain temperature. If the controller 26 determines at step 92 that the in-vehicle 10 temperature is greater than the certain temperature ("InCarTemp>26.7017"), then the controller 26, at step 94, activates the temperature altering element 24 to impart heat. However, if the controller 26 determines at step 92 that the in-vehicle 10 temperature is less than or equal to the certain temperature ("InCarTemp<=26.7017"), then the controller 26 proceeds to step 96 to again determine whether the in-vehicle 10 temperature ("InCarTemp") is greater or less than a certain temperature. At step 96, if the controller 26 determines that the in-vehicle 10 temperature ("InCarTemp") is less than or equal to a certain temperature ("InCarTemp<=24.46211"), then the controller 26 proceeds to step 98. At step 98, the controller 26 again determines whether the in-vehicle 10 temperature ("InCarTemp") is greater or less than a certain temperature. At step 98, if the controller 26 determines than that the in-vehicle 10 temperature is less than or equal to a certain temperature ("InCarTemp<=18.35714"), then the controller 26, at step 100, does not activate the temperature altering element 24 to produce heat or, if the controller 26 had already activated the temperature altering element 24 to produce heat, deactivates the temperature altering element 24. However, at step 98, if the controller 26 determines that the in-vehicle 10 temperature is greater than the certain temperature ("InCarTemp>18.35714"), then the controller 26, at step 102, activates the temperature altering element 24 to impart heat. Returning back to step 96, if the controller 26 determines that the in-vehicle 10 temperature is greater than the certain temperature ("InCarTemp>24.46211"), then the controller 26 proceeds to step 104. At step 104, the controller 26 determines whether the ambient temperature ("AirAmb_Te_ActlFilt") is greater or less than a certain temperature. At step 104, if the controller 26 determines that the ambient temperature is less then or equal to a certain temperature ("AirAmb_Te_ActlFilt<=5.649194"), then the controller 26 proceeds to step 106 and activates the temperature altering element 24 to impart heat. However, at step 104, if the controller 26 determines that the ambient temperature is greater than the certain temperature ("AirAmb_Te_ActlFilt>5.649194"), then the controller 26 proceeds to step 108 and does not activate the temperature altering element 24 to produce heat or, if the controller 26 had already activated the temperature altering element 24 to produce heat, deactivates the temperature altering element.

Note that, according to the rules of the Pre-established Predictive Activation Model formed pursuant to this CART analysis, when the ambient temperature is determined to be less than the certain temperature ("AirAmb_Te_Actl<=12.17466"), the Pre-established Predictive Model would initially automatically activate the temperature altering element 24 first as a function of the time of day (whether it is a morning hour or not) ("isMorning"). Even this relatively simple Pre-established Predictive Activation Model (for heating) demonstrates an advantage of such a model. Pursuant to the rule of the model below, although the ambient temperature might be considered cold enough ("less than or equal to 21.17466 degrees Celsius") to assume that an occupant of the first seating assembly 14 would want the temperature altering element 24 to impart heat, the rule of the Pre-established Predictive Activation Model does not activate/deactivates the temperature altering element 24 if the hour of the day is not considered a morning hour ("isMorning<=0: 0"), the last "0" signifying not activation/deactivation.

```
AirAmb_Te_Actl <= 12.17466:
:...isMorning <= 0: 0 (120)
```

An automatic control system based only on ambient temperature might automatically activate the temperature altering element 24 to impart heat against the desires of the occupant, resulting in disuse of the automatic control system. The Pre-established Predictive Activation Model of this disclosure, made via a CART analysis, identifies and forms rules to cover such potentially counter-intuitive circumstances.

Another example Pre-established Predictive Activation Model for heating formed pursuant to a C.50 program CART analysis of the data taken from the Test Vehicles relating to the Certain Identifiable Conditions is set forth below. This Pre-established Predictive Activation Model for heating set forth the rules governing when and whether the controller 26 activates/deactivates the temperature altering element 24 to impart heat as a function of input data relating to the Certain Identifiable Conditions in reference to vehicle 10. The example Pre-established Predictive Activation Model for heating is:

```
Smart_Wiper_Motor_Stat > 0: 0 (134)
Smart_Wiper_Motor_Stat <= 0:
:...AC_Request <= 1.358025: 0 (167/3)
```

```
AC_Request > 1.358025:
:...Front_Rt_Temp_Setpt > 148:
    :...Front_Rt_Temp_Setpt > 154.9836: 1 (14)
    :   Front_Rt_Temp_Setpt <= 154.9836:
    :   :...AirAmb_Te_ActlFilt > 7.580769: 0 (73)
    :       AirAmb_Te_ActlFilt <= 7.580769:
    :       :...AirAmb_Te_ActlFilt <= -2.632576: 1 (14)
    :           AirAmb_Te_ActlFilt > -2.632576:
    :           :...Front_Rear_Blower_Req <= 20.3375: 0 (27)
    :               Front_Rear_Blower_Req > 20.3375:
    :               :...AirAmb_Te_ActlFilt <= 5.283582: 0 (19)
    :                   AirAmb_Te_ActlFilt > 5.283582: 1 (31)
    Front_Rt_Temp_Setpt <= 148:
    :...Front_Left_Temp_Setpt > 150: 0 (74)
        Front_Left_Temp_Setpt <= 150:
        :...AirAmb_Te_Actl > 12.2037: 0 (48)
            AirAmb_Te_Actl <= 12.2037:
            :...AirAmb_Te_Actl <= 6.929124:
                :...Veh_V_ActlEng > 19.2492: 0 (51)
                :   Veh_V_ActlEng <= 19.2492:
                :   :...EngAout_N_Actl <= 893.8228: 0 (4)
                :       EngAout_N_Actl > 893.8228: 1 (3)
                AirAmb_Te_Actl > 6.929124:
                :...InCarTemp> 24.47753:
                    :...AirAmb_Te_ActlFilt <= 6.353571: 1 (2)
                    :   AirAmb_Te_ActlFilt > 6.353571: 0 (13)
                    InCarTemp <= 24.47753:
                    :...Veh_V_ActlEng > 29.94641: 1 (45/9)
                        Veh_V_ActlEng <= 29.94641:
                        :...Smart_Wiper_Motor_Stat_UB <= 0.9605263: 1 (3)
                            Smart_Wiper_Motor_Stat_UB > 0.9605263: 0 (6)
```

Figure 6A:
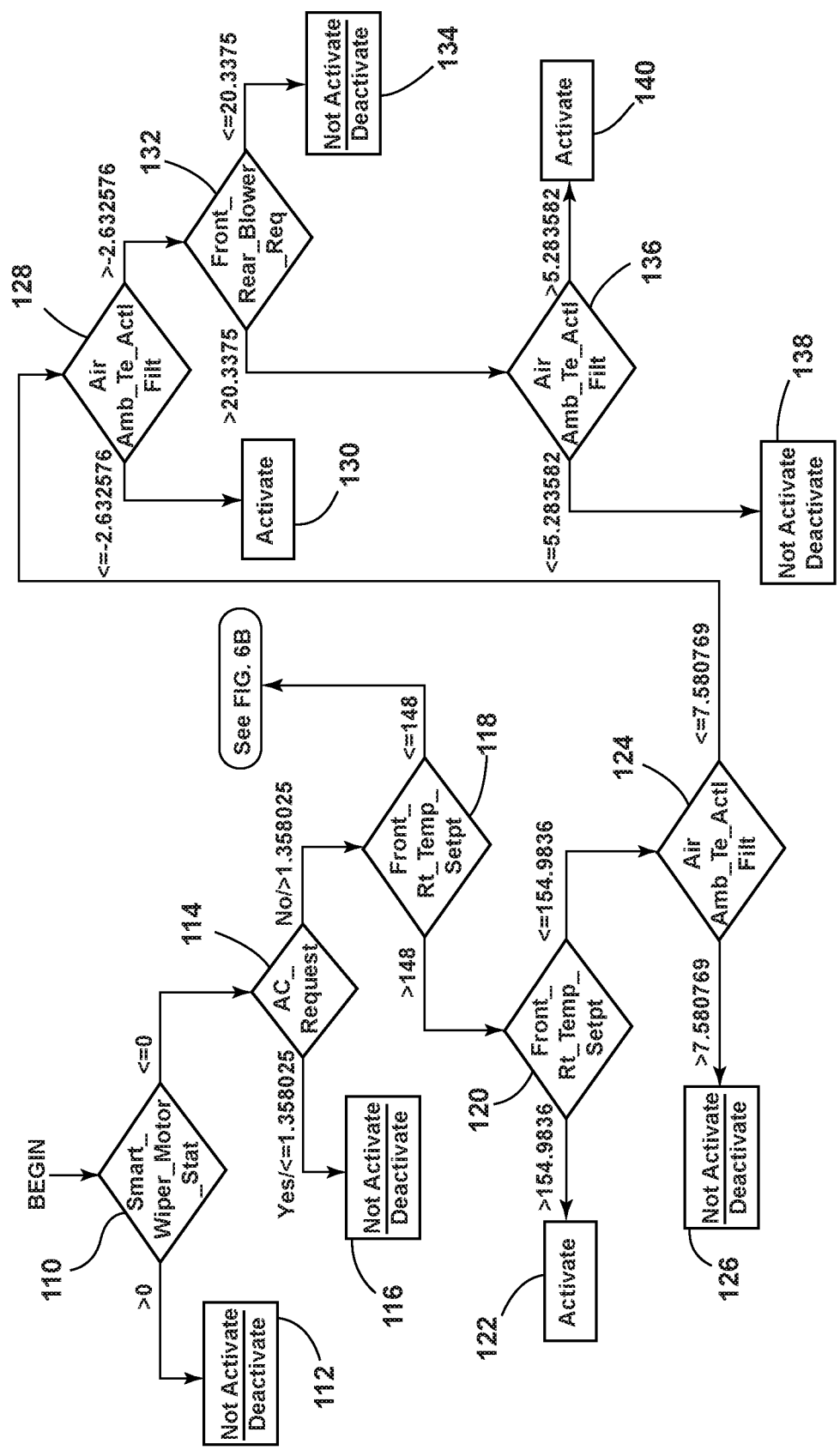
FIGS. 6A and 6B are schematic diagrams illustrating the rules of a second example Pre-established Predictive Activation Model (again for heating) providing the data relating to the Certain Identifiable Conditions that must exist for the controller to automatically activate the temperature altering element to impart heat and to not activate/automatically deactivate the temperature altering element.
Figure 6B:
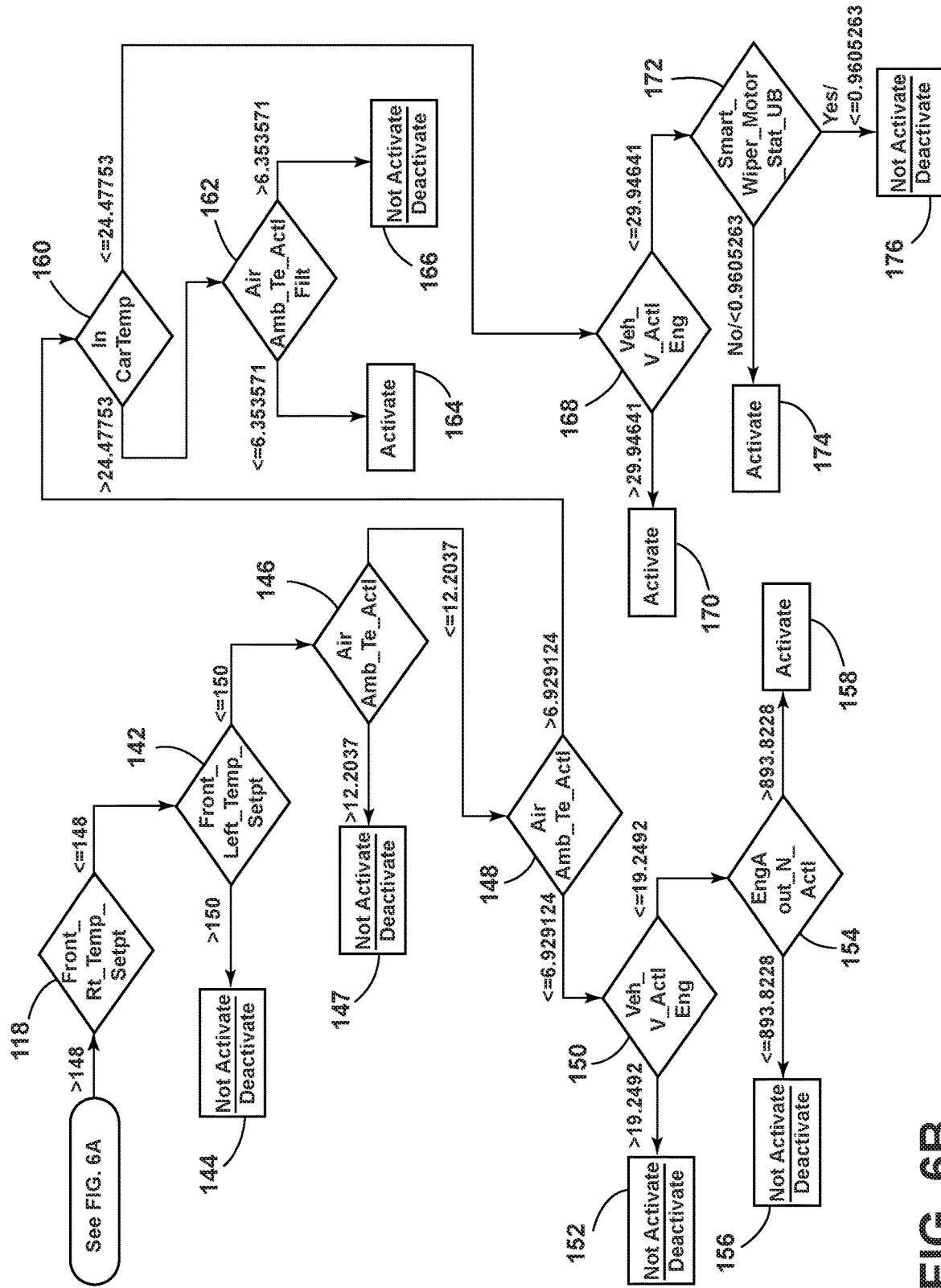

The rules of this example Pre-established Predictive Activation Model for heating is hereinafter further explained, with the aid of FIGS. 6A and 6B. The controller 26 at step 110 determines whether automatic windshield wipers are wiping because of sensed rain ("Smart_Wiper_Motor_Stat"). At step 110, if the controller 26 determines that the automatic windshield wipers are wiping ("Smart_Wiper_Motor_Stat>0"), then the controller 26, at step 112, does not activate the temperature altering element 24 to produce heat or, if the controller 26 had already activated the temperature altering element 24 to produce heat, deactivates the temperature altering element 24. However, at step 110, if the controller 26 determines that the automatic windshield wipers are not wiping ("Smart_Wiper_Motor_Stat<=0"), then the controller 26 proceeds to step 114. At step 114, the controller 26 determines whether the operator has activated an air conditioning function ("AC_Request"). At step 114, if the controller 26 determines that the operator has activated an air conditioning function ("AC_Request<=1.358025"), then the controller 26 at step 116 does not activate the temperature altering element 24 to produce heat or, if the controller 26 had already activated the temperature altering element 24 to produce heat, deactivates the temperature altering element 24. However, at step 114, if the controller 26 determines that the operator has not activated an air conditioning function ("AC_Request>1.358025"), then the controller 26 proceeds to step 118. At step 118, the controller 26 determines whether the front passenger side temperature set point ("Front_Rt_Temp_Setpt") is greater or less than a certain temperature. At step 118, if the controller 26 determines that the front passenger side temperature set point is greater than a certain temperature ("Front_Rt_Temp_Setpt>148"), then the controller 26 proceeds to step 120. At step 120, if the controller 26 determines that the front passenger side temperature set point is greater than a certain temperature ("Front_Rt_Temp_Setpt>154.9836"), then the controller 26 activates the temperature altering element 24, at step 122, to produce heat. However, at step 120, if the controller 26 determines that the front passenger side temperature set point is less than or equal to the certain temperature ("Front_Rt_Temp_Setpt<=154.9836"), the controller 26 proceeds to step 124. At step 124, the controller 26 determines whether the ambient air temperature ("AirAmb_Te_ActlFilt") is greater than or less than a certain temperature. At step 124, if the controller 26 determines that the ambient air temperature is greater than a certain temperature ("AirAmb_Te_ActlFilt>7.580769"), then, at step 126, the controller 26 does not activate the temperature altering element 24 to produce heat or, if the controller 26 had already activated the temperature altering element 24 to produce heat, deactivates the temperature altering element 24. However, if at step 124 the controller 26 determines that the ambient air temperature is less than or equal to the certain temperature ("AirAmb_Te_ActlFilt<=7.580769"), then the controller 26 proceeds to step 128. At step 128, the controller 26 again determines whether the ambient temperature ("AirAmb_Te_ActlFilt") is greater or less than a certain temperature. At step 128, if the controller 26 determines that the ambient temperature is less than or equal to a certain temperature ("AirAmb_Te_ActlFilt<=-2.632576"), then the controller 26, at step 130, activates the temperature altering element 24 to impart heat. However, at step 128, if the controller 26 determines that the ambient temperature is greater than the certain temperature ("AirAmb_Te_ActlFilt>-2.632576"), then the controller 26 proceeds to step 132. At step 132, the controller 26 determines whether the vehicle's climate control system is blowing air greater than or less than a certain level ("Front_Rear_Blower_Req"). At step 132, if the controller 26 determines that the vehicle's 10 climate control system is blowing air at a level less than or equal to a certain level ("Front_Rear_Blower_Req<=20.3375"), then the controller 26, at step 134, does not activate the temperature altering element 24 to produce heat or, if the controller 26 had already activated the temperature altering element 24 to produce heat, deactivates the temperature altering element 24. However, if at step 132 the controller 26 determines that the vehicle's 10 climate control system is blowing air at a level greater than the certain level ("Front_Rear_Blower_Req>20.3375"), then the controller 26 proceeds to step 136. At step 136, the controller 26 determines whether the ambient temperature ("AirAmb_Te_ActlFilt") is greater than or less than a certain temperature. At step 136, if the controller 26 determines that the ambient temperature is less than or equal to a certain temperature ("AirAmb_Te_ActlFilt<=5.283582"), then the controller 26, at step 138, does not activate the temperature altering element 24 to produce heat or, if the controller 26 had already activated the temperature altering element 24 to produce heat, deactivates the temperature altering element 24. However, at step 136, if the controller 26 determines that the ambient temperature is greater than the certain temperature ("AirAmb_Te_ActlFilt>5.283582"), then the controller 26, at step 140, activates the temperature altering element 24 to impart heat.

If at step 118 the controller 26 determines that the front passenger side temperature set point is less than or equal to the certain temperature ("Front_Rt_Temp_Setpt<=148"), then the controller 26 proceeds to step 142. At step 142, the controller 26 determines whether the front operator side temperature set point ("Front_Left_Temp_Setpt") is greater or less than a certain temperature. At step 142, if the controller 26 determines that the front operator side temperature set point is greater than a certain temperature ("Front_Left_Temp_Setpt>150"), then the controller 26, at step 144, does not activate the temperature altering element 24 to produce heat or, if the controller 26 had already activated the temperature altering element 24 to produce heat, deactivates the temperature altering element 24. However, at step 142, if the controller 26 determines that the front operator side temperature set point is less than or equal to the certain temperature ("Front_Left_Temp_Setpt<=150"), then the controller 26 proceeds to step 146. At step 146, the controller 26 determines whether the ambient temperature ("AirAmb_Te_Actl") is greater or less than a certain temperature. At step 146, if the controller 26 determines that the ambient temperature is greater than a certain temperature ("AirAmb_Te_Actl>12.2037"), then the controller 26, at step 147, does not activate the temperature altering element 24 to produce heat or, if the controller 26 had already activated the temperature altering element 24 to produce heat, deactivates the temperature altering element 24. However, at step 146, if the controller 26 determines that the ambient temperature is less than or equal to the certain temperature ("AirAmb_Te_Actl<=12.2037"), then the controller 26 proceeds to step 148. At step 148, the controller 26 again determines whether the ambient temperature ("AirAmb_Te_Actl") is greater than or less than a certain temperature. At step 148, if the controller 26 determines that the ambient temperature is less than or equal to a certain temperature ("AirAmb_Te_Actl<=6.929124"), then the controller 26 proceeds to step 150. At step 150, the controller 26 determines whether the vehicle 10 speed is greater than or less than a certain value. At step 150, if the controller 26 determines that the vehicle 10 speed is greater than a certain value ("Veh_V_ActlEng>19.2492"), then the controller 26, at step 152, does not activate the temperature altering element 24 to produce heat or, if the controller 26 had already activated the temperature altering element 24 to produce heat, deactivates the temperature altering element 24. However, at step 150, if the controller 26 determines that the vehicle 10 speed is less than or equal to the certain value ("Veh_V_ActlEng<=19.2492"), then the controller 26 proceeds to step 154. At step 154, the controller 26 determines whether engine speed ("EngAout_N_Actl") is greater or less than a certain value. At step 154, if the controller 26 determines that the engine speed is less than or equal to a certain value ("EngAout_N_Actl<=893.8228"), then the controller 26, at step 156, does not activate the temperature altering element 24 to produce heat or, if the controller 26 had already activated the temperature altering element 24 to produce heat, deactivates the temperature altering element 24. However, at step 154, if the controller 26 determines that the engine speed is greater than the certain value ("EngAout_N_Actl>893.8228"), then the controller 26, at step 158, activates the temperature altering element 24 to impart heat. Referring back to step 148, if the controller 26 determines that the ambient temperature is greater than the certain temperature ("AirAmb_Te_Actl>6.929124"), then the controller 26 proceeds to step 160. At step 160, the controller 26 determines whether the in-vehicle 10 temperature ("InCarTemp") is greater than or less than a certain temperature. At step 160, if the controller 26 determines that the in-vehicle 10 temperature is greater than a certain value ("InCarTemp>24.47753"), then the controller 26 proceeds to step 162. At step 162, the controller 26 again determines whether the ambient temperature ("AirAmb_Te_ActlFilt") is greater or less than a certain temperature. At step 162, if the controller 26 determines that the ambient temperature is less than or equal to a certain temperature ("AirAmb_Te_ActlFilt<=6.353571), then the controller 26, at step 164, activates the temperature altering element 24 to impart heat. However, if the controller 26 determines, at step 162, that the ambient temperature is greater than the certain temperature ("AirAmb_Te_ActlFilt>6.353571"), then the controller 26, at step 166, does not activate the temperature altering element 24 to produce heat or, if the controller 26 had already activated the temperature altering element 24 to produce heat, deactivates the temperature altering element 24. Referring back to step 160, if the controller 26 determines that the in-vehicle 10 temperature is less than or equal to the certain temperature ("InCarTemp<=24.47753"), then the controller 26 proceeds to step 168. At step 168, the controller 26 determines whether the vehicle 10 speed ("Veh_V_ActlEng") is greater than or less than a certain speed. At step 168, if the controller 26 determines that the vehicle 10 speed is greater than a certain speed ("Veh_V_ActlEng>29.94641"), then the controller 26, at step 170, activates the temperature altering element to impart heat. However, at step 168, if the controller 26 determines that the vehicle 10 speed is less than or equal to the certain speed ("Veh_V_ActlEng<=29.94641"), then the controller 26 proceeds to step 172. At step 172, the controller 26 determines whether the whether automatic windshield wipers are wiping because of sensed rain ("Smart_Wiper_Motor_Stat_UB"). At step 172, if the controller 26 determines that the automatic windshield wipers are not wiping because of sensed rain (Smart_Wiper_Motor_Stat_UB<=0.9605263), then the controller 26, at step 174, activates the temperature altering element 24 to impart heat. However, at step 172, if the controller 26 determines that the automatic windshield wipers are wiping because of sensed rain ("Smart_Wiper_Motor_Stat_UB>0.9605263"), then the controller 26, at step 176, does not activate the temperature altering element 24 to produce heat or, if the controller 26 had already activated the temperature altering element 24 to produce heat, deactivates the temperature altering element 24.

An example Pre-established Predictive Activation Model for cooling formed pursuant to a C.50 program CART analysis of the data taken from the Test Vehicles relating to the Certain Identifiable Conditions is set forth below. This Pre-established Predictive Activation Model for cooling sets forth the rules governing when and whether the controller 26 activates/deactivates the temperature altering element 24 to impart cooling as a function of input data relating to the Certain Identifiable Conditions in reference to vehicle 10. The example Pre-established Predictive Activation Model for cooling is:

already activated the temperature altering element 24 to provide cooling, deactivates the temperature altering element 24. However, at step 182 if the controller 26 determines that the ambient temperature is greater than the certain temperature ("AirAmb_Te_ActlFilt>20.35959"), then the controller 26 proceeds to step 186. At step 186, the controller 26 determines whether the level at which the vehicle's 10 climate control system is blowing air ("Front_Rear_Blower_Req") is greater or less than a certain level.

```
InCarTemp <= 24.07895: 0 (793)
InCarTemp > 24.07895:
:...AirAmb_Te_ActlFilt <= 20.35959: 0 (75)
    AirAmb_Te_ActlFilt > 20.35959:
    :...Front_Rear_Blower_Req <= 1.785714:
        :...Overriding_ModeReq > 0.4810127: 0 (14)
        :   Overriding_ModeReq <= 0.4810127:
        :   :...AirAmb_Te_ActlFilt <= 21.76103: 1 (53/7)
        :       AirAmb_Te_ActlFilt > 21.76103:
        :       :...InCarTemp <= 26.8012:
        :       :   :...InCarTemp <= 24.73298:
        :       :   :   :...AirAmb_Te_Actl_UB <= 0.9703704: 0 (6)
        :       :   :   :   AirAmb_Te_Actl_UB > 0.9703704: 1 (2)
        :       :   :   InCarTemp > 24.73298:
        :       :   :   :...Veh_V_ActlEng <= 67.21477: 1 (23)
        :       :   :       Veh_V_ActlEng > 67.21477: 0 (4/1)
        :       :   InCarTemp > 26.8012:
        :       :   :...AC_Request > 0.375: 0 (16)
        :       :       AC_Request <= 0.375:
        :       :       :...AirAmb_Te_Actl <= 22.88243: 0 (15/1)
        :       :           AirAmb_Te_Actl > 22.88243:
        :       :           :...AirAmb_Te_ActlFilt <= 23.40385: 1 (7/1)
        :       :               AirAmb_Te_ActlFilt > 23.40385: 0 (15/4)
        Front_Rear_Blower_Req > 1.785714:
        :...InCarTemp <= 25.14154: 0 (33)
            InCarTemp > 25.14154:
            :...EngAout_N_Actl > 1359.044: 0 (41/1)
                EngAout_N_Actl <= 1359.044:
                :...AC_Request <= 0.8536586: 0 (8)
                    AC_Request > 0.8536586:
                    :...Veh_V_ActlEng > 66.09882: 1 (4)
                        Veh_V_ActlEng <= 66.09882:
                        :...Front_Rear_Blower_Req <= 3.236842:
                            :...EngAout_N_Actl <= 1314.136: 0 (44/6)
                            :   EngAout_N_Actl > 1314.136: 1 (4/1)
                            Front_Rear_Blower_Req > 3.236842:
                            :...Smart_Wiper_Motor_Stat_UB <= 0.8877551: 0 (5)
                                Smart_Wiper_Motor_Stat_UB > 0.8877551: 1 (7/1)
```

Figure 7A:
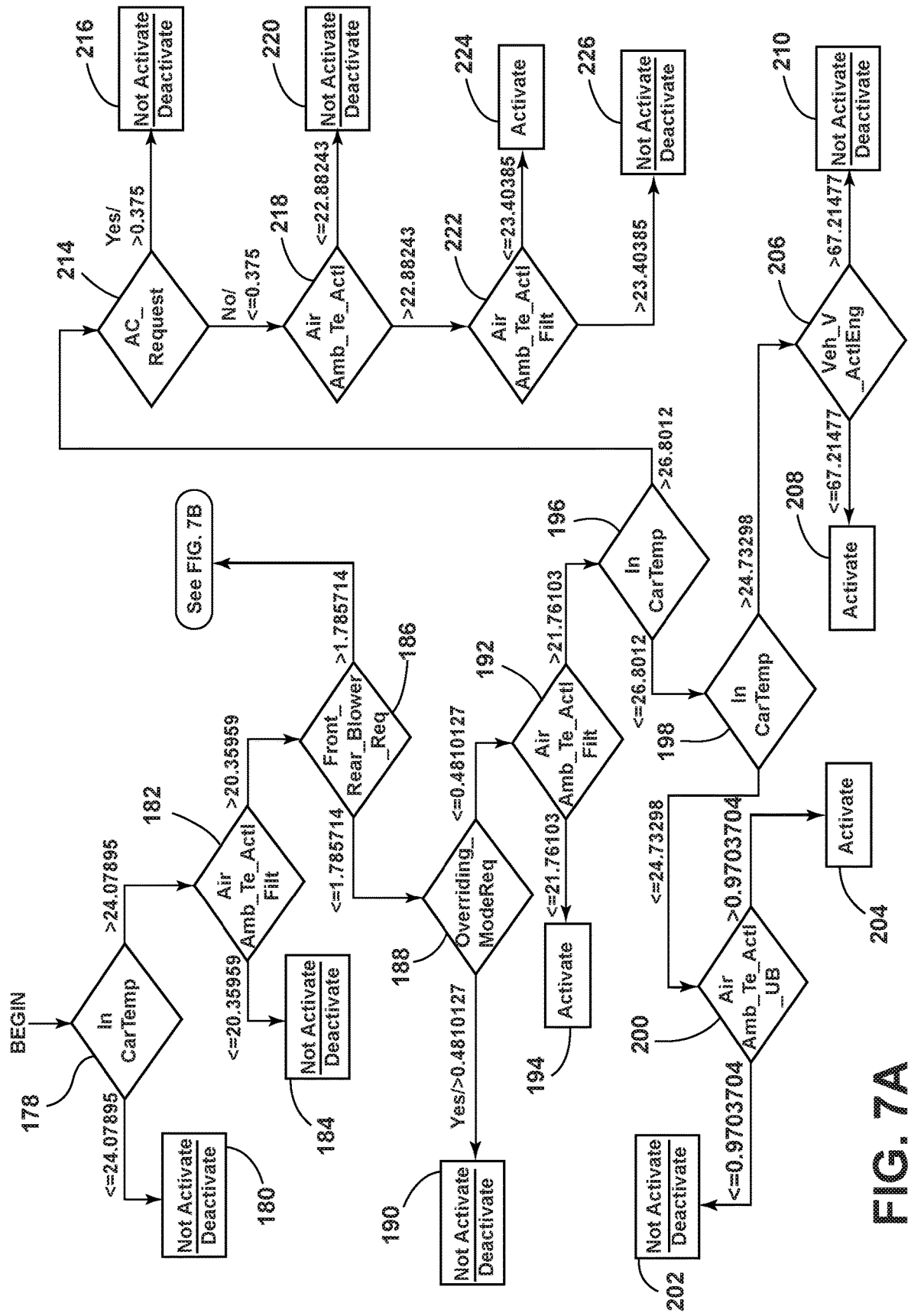
FIGS. 7A and 7B are schematic diagrams illustrating the rules of a third example Pre-established Predictive Activation Model (this time for cooling) providing the data relating to the Certain Identifiable Conditions that must exist for the controller to automatically activate the temperature altering element to impart cooling and to not activate/automatically deactivate the temperature altering element.

The rules of this example Pre-established Predictive Activation Model for cooling is hereinafter further explained, with the aid of FIGS. 7A and 7B. At step 178, the controller 26 initially determines whether the in-vehicle 10 temperature ("InCarTemp") is greater than or less than a certain temperature. At step 178, if the controller 26 determines that the in-vehicle 10 temperature is less than or equal to a certain temperature ("InCarTemp<=24.07895"), then the controller 26, at step 180, does not activate the temperature altering element 24 to provide cooling or, if the controller 26 had already activated the temperature altering element 24 to provide cooling, deactivates the temperature altering element 24. However, at step 178, if the controller 26 determines that the in-vehicle 10 temperature is greater than the certain temperature ("InCarTemp>24.07895"), then the controller 26 proceeds to step 182. At step 182, the controller 26 determines whether the ambient temperature ("AirAmb_Te_ActlFilt") is greater or less than a certain temperature. At step 182, if the controller 26 determines that the ambient temperature is less than or equal to a certain temperature ("AirAmb_Te_ActlFilt<=20.35959"), then the controller 26, at step 184, does not activate the temperature altering element 24 to provide cooling or, if the controller 26 had At step 186, if the controller 26 determines that the vehicle's 10 climate control system is blowing air at a level less than or equal to a certain level ("Front_Rear_Blower_Req<=1.785714"), then the controller 26 proceeds to step 188. At step 188, the controller 26 determines whether the operator has activated a rear window defrost function ("Overriding_ModeReq"). At step 188, if the controller determines that the operator has activated a rear window defrost function ("Overriding_ModeReq>0.4810127"), then the controller 26, at step 190, activates the temperature altering element 24 to providing cooling. However, at step 188, if the controller 26 determines that the operator has not activated a rear window defrost function ("Overriding_ModeReq<=0.4810127"), then the controller 26 proceeds to step 192. At step 192, the controller 26 determines whether the ambient temperature ("AirAmb_Te_ActlFilt") is greater than or less than a certain temperature. At step 192, if the controller 26 determines that the ambient temperature is less than or equal to a certain temperature ("AirAmb_Te_ActlFilt<=21.76103"), then the controller 26, at step 194, activates the temperature altering element 24 to providing cooling. However, at step 192, if the controller 26 determines that the ambient temperature is greater than the certain temperature ("AirAmb_Te_ActlFilt>21.76103"), then the controller 26 proceeds to step 196. At step 196, the controller 26 determines whether the in-vehicle 10 temperature is greater than or less than a certain temperature ("InCarTemp"). At step 196, if the in-vehicle temperature is less than or equal to a certain temperature ("InCarTemp<=26.8012"), then the controller 26 proceeds to step 198. At step 198, the controller 26 again determines whether the in-vehicle 10 temperature ("InCarTemp") is greater than or less than a certain temperature. At step 198, if the controller 26 determines that the in-vehicle 10 temperature is less than or equal to a certain temperature ("InCarTemp<=24.73298"), then the controller 26 proceeds to step 200. At step 200, the controller 26 determines whether the ambient temperature ("AirAmb_Te_Actl_UB") is above or below a certain temperature. At step 200, if the controller 26 determines that the ambient temperature is less than or equal to a certain temperature ("AirAmb_Te_Actl_UB<=0.9703704"), then the controller 26, at step 202, does not activate the temperature altering element 24 to provide cooling or, if the controller 26 had already activated the temperature altering element 24 to provide cooling, deactivates the temperature altering element 24. However, at step 200, if the controller 26 determines that the ambient temperature is greater than the certain temperature ("AirAmb_Te_Actl_UB>0.9703704"), then the controller 26 at, step 204, activates the temperature altering element 24 to providing cooling. Referring back to step 198, if the controller 26 determines that the in-vehicle 10 temperature is greater than the certain temperature ("InCarTemp>24.73298"), then the controller 26 proceeds to step 206. At step 206, the controller 26 determines whether the vehicle 10 speed ("Veh_V_ActlEng") is greater than or less than a certain value. At step 206, if the controller 26 determines that the vehicle 10 speed is less than or equal to a certain value ("Veh_V_ActlEng<=67.21477), then the controller 26, at step 208, activates the temperature altering element 24 to providing cooling. However, at step 206, if the controller 26 determines that the vehicle 10 speed is greater than the certain value ("Veh_V_ActlEng>67.21477"), then the controller 26, at step 210, does not activate the temperature altering element 24 to provide cooling or, if the controller 26 had already activated the temperature altering element 24 to provide cooling, deactivates the temperature altering element 24.

Referring back to step 196, if the controller 26 determines that the in-vehicle 10 temperature is greater than the certain value ("InCarTemp>26.8012"), then the controller 26 proceeds to step 214. At step 214, the controller 26 determines whether the operator has activated an air conditioning function ("AC_Request"). At step 214, if the controller 26 determines that the operator has activated an air conditioning function ("AC_Request>0.375"), then the controller 26, at step 216, does not activate the temperature altering element 24 to provide cooling or, if the controller 26 had already activated the temperature altering element 24 to provide cooling, deactivates the temperature altering element 24. However, at step 214, if the controller 26 determines that the operator has not activated an air conditioning function ("AC_Request<=0.375"), then the controller 26 proceeds to step 218. At step 218, the controller 26 determines whether the ambient temperature is greater than or less than a certain temperature. At step 218, if the controller 26 determines that the ambient temperature is less than or equal to a certain temperature ("AirAmb_Te_Actl<=22.88243"), then the controller 26, at step 220, does not activate the temperature altering element 24 to provide cooling or, if the controller 26 had already activated the temperature altering element 24 to provide cooling, deactivates the temperature altering element 24. However, at step 218, if the controller 26 determines that the ambient temperature is greater than the certain temperature ("AirAmb_Te_Actl>22.88243"), then the controller 26 proceeds to step 222. At step 222, the controller 26 determines whether the ambient temperature ("AirAmb_Te_ActlFilt") is again greater than or less than a certain temperature. At step 222, if the controller 26 determines that the ambient temperature is less than or equal to a certain temperature ("AirAmb_Te_ActlFilt<=23.40385"), then the controller 26, at step 224, activates the temperature altering element 24 to providing cooling. However, at step 222, if the controller 26 determines that the ambient temperature is greater than the certain temperature ("AirAmb_Te_ActlFilt>23.40385"), then the controller 26, at step 226, does not activate the temperature altering element 24 to provide cooling or, if the controller 26 had already activated the temperature altering element 24 to provide cooling, deactivates the temperature altering element 24.

Figure 7B:
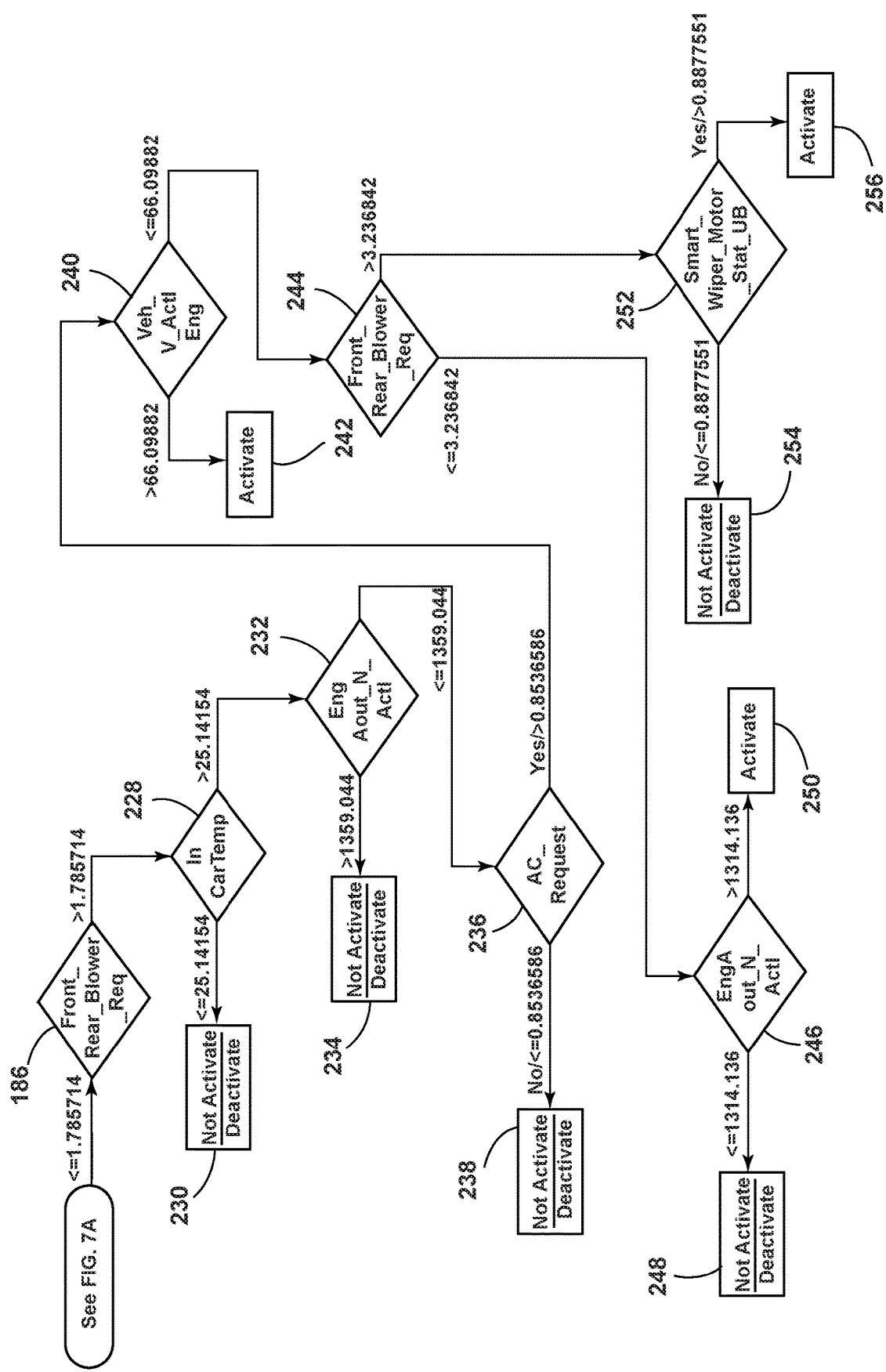

Referring now to FIG. 7B, at step 186, if the controller 26 determines that the vehicle's 10 climate control system is blowing air at a level greater than the certain level ("Front_Rear_Blower_Req>1.785714"), then the controller 26 proceeds to step 228. At step 228, the controller 26 determines whether the in-vehicle 10 temperature ("InCarTemp") is greater than or less than a certain temperature. At step 228, if the controller 26 determines that the in-vehicle 10 is less than or equal to a certain temperature ("InCarTemp<=25.14154"), then the controller 26, at step 230, does not activate the temperature altering element 24 to provide cooling or, if the controller 26 had already activated the temperature altering element 24 to provide cooling, deactivates the temperature altering element 24. However, at step 228, if the controller 26 determines that the in-vehicle 10 temperature is greater than the certain temperature ("InCarTemp>25.14154"), then the controller 26 proceeds to step 232. At step 232, the controller 26 determines whether the engine speed ("EngAout_N_Actl") is greater or less than a certain value. At step 232, if the controller 26 determines that the engine speed is greater than a certain value ("EngAout_N_Actl>1359.044"), then the controller 26, at step 234, does not activate the temperature altering element 24 to provide cooling or, if the controller 26 had already activated the temperature altering element 24 to provide cooling, deactivates the temperature altering element 24. However, at step 232, if the controller 26 determines that the engine speed is less than or equal to a certain value ("EngAout_N_Actl<=1359.044"), then the controller 26 proceeds to step 236. At step 236, the controller 26 determines whether the operator has activated an air conditioning function ("AC_Request"). At step 236, if the controller 26 determines that the operator has not activated an air conditioning function ("AC_Request<=0.8536586"), then the controller 26, at step 238, does not activate the temperature altering element 24 to provide cooling or, if the controller 26 had already activated the temperature altering element 24 to provide cooling, deactivates the temperature altering element 24. However, at step 236, if the controller 26 determines that the operator has activated an air conditioning function ("AC_Request>0.8536586"), then the controller 26 proceeds to step 240. At step 240, the controller 26 determines whether the vehicle 10 speed ("Veh_V_ActlEng") is greater than or less than a certain value. At step 240, if the controller 26 determines that the vehicle 10 speed is greater than a certain value ("Veh_V_ActlEng>66.09882"), then the controller 26, at step 242, activates the temperature altering element 24 to provide cooling. However, at step 240, if the controller 26 determines that the vehicle 10 speed is less than or equal to the certain value ("Veh_V_ActlEng<=66.09882"), then the controller 26 proceeds to step 244. At step 244, the controller 26 determines whether the level at which the vehicle's 10 climate control system is blowing air ("Front_Rear_Blower_Req") is greater or less than a certain level. At step 244, if the controller 26 determines that the vehicle's 10 climate control system is blowing air at a level that is less than or equal at a certain level ("Front_Rear_Blower_Req<=3.236842"), then the controller 26 proceeds to step 246. At step 246, the controller 26 determines whether the engine speed ("EngAout_N_Actl") is greater or less than a certain value. At step 246, if the controller 26 determines that the engine speed is less than or equal to a certain value ("EngAout_N_Actl<=1314.136"), then the controller 26, at step 248, does not activate the temperature altering element 24 to provide cooling or, if the controller 26 had already activated the temperature altering element 24 to provide cooling, deactivates the temperature altering element 24. However, at step 246, if the controller 26 determines that the engine speed is greater than a certain value ("EngAout_N_Actl>1314.136"), then the controller 26, at step 250, activates the temperature altering element 24 to provide cooling. Referring back to step 244, if the controller 26 determines that the vehicle's 10 climate control system is blowing air at a level that is greater than the certain level ("Front_Rear_Blower_Req>3.236842"), then the controller 26 proceeds to step 252. At step 252, the controller 26 determines the whether automatic windshield wipers are wiping because of sensed rain ("Smart_Wiper_Motor_Stat_UB"). At step 252, if the controller 26 determines that the automatic windshield wipers are not wiping ("Smart_Wiper_Motor_Stat_UB<=0.8877551"), then the controller 26, at step 254, does not activate the temperature altering element 24 to provide cooling or, if the controller 26 had already activated the temperature altering element 24 to provide cooling, deactivates the temperature altering element 24. However, at step 252, if the controller 26 determines that the automatic windshield wipers are wiping because of sensed rain ("Smart_Wiper_Motor_Stat_UB>0.8877551"), then the controller 26, at step 256, activates the temperature altering element 24 to provide cooling.

Another example Pre-established Predictive Activation Model for cooling formed pursuant to a C.50 program CART analysis of the data taken from the Test Vehicles relating to the Certain Identifiable Conditions is set forth below. This Pre-established Predictive Activation Model for cooling set forth the rules governing when and whether the controller 26 activates/deactivates the temperature altering element 24 to impart cooling as a function of input data relating to the Certain Identifiable Conditions in reference to vehicle 10. The example Pre-established Predictive Activation Model for cooling is:

```
AirAmb_Te_ActlFilt <= 24.625:
:...InCarTemp > 26.61513:
:     :...AirAmb_Te_ActlFilt > 23.48864: 0 (82/22)
:     :   : AirAmb_Te_ActlFilt <= 23.48864:
:     :   :...Smart_Wiper_Motor_Stat > 0.962963:
:     :       :...EngAout_N_Actl > 1229.604: 0 (22)
:     :       :   EngAout_N_Actl <= 1229.604:
:     :       :   :...Veh_V_ActlEng <= 39.26561: 0 (6)
:     :       :       Veh_V_ActlEng > 39.26561: 1 (6/1)
:     :       Smart_Wiper_Motor_Stat <= 0.962963:
:     :       :...AirAmb_Te_Actl_UB <= 0.9536424: 0 (278)
:     :           AirAmb_Te_Actl_UB > 0.9536424:
:     :           :...Recirc_Request > 1.942857: 0 (162/5)
:     :               Recirc_Request <= 1.942857:
:     :               :...Overriding_ModeReq <= 3.433735: 0 (5)
:     :                   Overriding_ModeReq > 3.433735: 1 (4)
:     InCarTemp <= 26.61513:
:     :...InCarTemp <= 15.03421:
:         :...Smart_Wiper_Motor_Stat <= 0.02469136: 0 (193/2)
:         :   Smart_Wiper_Motor_Stat > 0.02469136:
:         :   :...RrDefrost_HtdMirrState <= 0: 0 (26)
:         :       RrDefrost_HtdMirrState > 0: 1 (6)
:         InCarTemp > 15.03421:
:         :...AirAmb_Te_ActlFilt <= 18.74609: 0 (5698)
:             AirAmb_Te_ActlFilt > 18.74609:
:             :...Front_Rt_Temp_Setpt > 140: 0 (1575/7)
:                 Front_Rt_Temp_Setpt <= 140:
:                 :...Recirc_Request <= 1.386667:
:                     :...AC_Request <= 0.4716981: 0 (11)
:                     :   AC_Request > 0.4716981: 1 (8)
:                     Recirc_Request > 1.386667:
:                     :...AirAmb_Te_ActlFilt > 20.61765: 0 (116)
:                         AirAmb_Te_ActlFilt <= 20.61765:
:                         :...Veh_V_ActlEng > 78.98829: 0 (37)
:                             Veh_V_ActlEng <= 78.98829:
:                             :...AirAmb_Te_ActlFilt <= 20.09615: 0 (35/3)
:                                 AirAmb_Te_ActlFilt > 20.09615:
:                                 :...AirAmb_Te_Actl_UB <= 0.9739583: 1 (8/1)
:                                     AirAmb_Te_Actl_UB > 0.9739583: 0 (2)
AirAmb_Te_ActlFilt > 24.625:
:...Overriding_ModeReq > 2: 1 (39)
    Overriding_ModeReq <= 2:
    :...Front_Rt_Temp_Setpt <= 137.1282:
        :...Front_Left_Temp_Setpt > 138.9091: 0 (6)
        :   Front_Left_Temp_Setpt <= 138.9091:
```

-continued

```
        :     :...AC_Request > 1.865169: 1 (89/1)
        :        AC_Request <= 1.865169:
        :        :...AirAmb_Te_Actl > 29.97377: 1 (8)
        :            AirAmb_Te_Actl <= 29.97377:
        :            :...AirAmb_Te_ActlFilt <= 26.47635: 1 (6/1)
        :                AirAmb_Te_ActlFilt > 26.47635: 0 (5)
Front_Rt_Temp_Setpt > 137.1282:
:...Veh_V_ActlEng_UB <= 0.5419847: 0 (65)
    Veh_V_ActlEng_UB > 0.5419847:
    :...Front_Rt_Temp_Setpt > 145.4545:
        :...Front_Left_Temp_Setpt <= 141: 1 (3)
        :    Front_Left_Temp_Setpt > 141: 0 (155/2)
        Front_Rt_Temp_Setpt <= 145.4545:
        :...Smart_Wiper_Motor_Stat > 0: 0 (37/3)
            Smart_Wiper_Motor_Stat <= 0:
            :...Front_Left_Temp_Setpt <= 141:
                :...Front_Left_Temp_Setpt <= 136.4545:
                :   :...Front_Left_Temp_Setpt > 135.9403: 0 (31/1)
                :   :   Front_Left_Temp_Setpt <= 135.9403:
                :   :   :...EngAout_N_Actl <= 717.6779: 0 (2)
                :   :       EngAout_N_Actl > 717.6779: 1 (7)
                :   Front_Left_Temp_Setpt > 136.4545:
                :   :...InCarTemp > 31.74133: 1 (43/9)
                :       InCarTemp <= 31.74133:
                :       :...AC_Request <= 1.969697: 1 (21/6)
                :           AC_Request > 1.969697:
                :           :...Veh_V_ActlEng <= 3.155782:
                :               :...AirAmb_Te_Actl <= 38.275: 0 (35/3)
                :               :   AirAmb_Te_Actl > 38.275: 1 (6/2)
                :               Veh_V_ActlEng > 3.155782:
                :               :...EngAout_N_Actl <= 787.2729: 1 (20/1)
                :                   EngAout_N_Actl > 787.2729:
                :                   :...AirAmb_Te_ActlFilt <= 27.65357:
                :                       :...InCarTemp <= 27.5: 0 (98/25)
                :                       :   InCarTemp > 27.5: [S1]
                :                       AirAmb_Te_ActlFilt > 27.65357: [S2]
                Front_Left_Temp_Setpt > 141:
                :...AC_Request <= 1.962963: 0 (58/4)
                    AC_Request > 1.962963:
                    :...InCarTemp > 27.98413:
                        :...Front_Rt_Temp_Setpt > 143.5667:
                        :   :...AirAmb_Te_ActlFilt <= 27.77917: 0 (46/6)
                        :   :   AirAmb_Te_ActlFilt > 27.77917:
                        :   :   :...EngAout_N_Actl <= 1985.537: 0 (56/22)
                        :   :       EngAout_N_Actl > 1985.537: 1 (11)
                        :   Front_Rt_Temp_Setpt <= 143.5667:
                        :   :...AirAmb_Te_Actl > 29.28607: 0 (15/1)
                        :       AirAmb_Te_Actl <= 29.28607: [S3]
                        InCarTemp <= 27.98413:
                        :...AirAmb_Te_ActlFilt <= 25.1306:
                            :...AirAmb_Te_Actl >27.47011: 1 (23)
                            :   AirAmb_Te_Actl <= 27.47011:
                            :   :...AirAmb_Te_ActlFilt > 25.10547: 1 (4)
                            :       AirAmb_Te_ActlFilt <= 25.10547:
                            :       :...InCarTemp <= 26.84985: 0 (48/5)
                            :           InCarTemp > 26.84985: 1 (6/1)
                            AirAmb_Te_ActlFilt > 25.1306:
                            :...Front_Rt_Temp_Setpt <= 143.1868:
                                :...Front_Left_Temp_Setpt > 142.08: 0 (12)
                                :   Front_Left_Temp_Setpt <= 142.08:
                                :   :...Front_Rt_Temp_Setpt <= 140.5128: [S4]
                                :       Front_Rt_Temp_Setpt > 140.5128: [S5]
                                Front_Rt_Temp_Setpt > 143.1868:
                                :...InCarTemp <= 24.00275:
                                    :...InCarTemp <= 21.79952: 0 (7)
                                    :   InCarTemp > 21.79952: [S6]
                                    InCarTemp > 24.00275:
                                    :...AirAmb_Te_Actl > 30.30851: 0 (69/2)
                                        AirAmb_Te_Actl <= 30.30851:
                                        :...InCarTemp <= 25.34836: 0 (80/10)
                                            InCarTemp > 25.34836: [S7]

SubTree [S1]
Front_Rt_Temp_Setpt > 140.2687: 1 (17/1)
Front_Rt_Temp_Setpt <= 140.2687:
:...EngAout_N_Actl <= 1844.128: 0 (17/4)
    EngAout_N_Actl > 1844.128: 1 (6)
SubTree [S2]
AirAmb_Te_ActlFilt > 33.2: 0 (14/1)
AirAmb_Te_ActlFilt <= 33.2:
```

```
:...InCarTemp <= 27.95664: 1 (132/32)
    InCarTemp > 27.95664:
    :...Front_Rt_Temp_Setpt <= 143: 0 (44/12)
        Front_Rt_Temp_Setpt > 143:
        :...Smart_Wiper_Motor_Stat_UB <= 0.8817204: 0 (2)
            Smart_Wiper_Motor_Stat_UB > 0.8817204: 1 (7)
SubTree [S3]
Smart_Wiper_Motor_Stat_UB > 0.9821429: 1 (37/2)
Smart_Wiper_Motor_Stat_UB <= 0.9821429:
:...AirAmb_Te_ActlFilt <= 25.80303: 1 (6)
    AirAmb_Te_ActlFilt > 25.80303:
    :...AirAmb_Te_ActlFilt <= 28.03788: 0 (5)
        AirAmb_Te_ActlFilt > 28.03788: 1 (2)
SubTree [S4]
AirAmb_Te_ActlFilt <= 27.1194: 0 (8)
AirAmb_Te_ActlFilt > 27.1194: 1 (4)
SubTree [S5]
Front_Rear_Blower_Req <= 7: 1 (7)
Front_Rear_Blower_Req > 7: 0 (181/27)
SubTree [S6]
Front_Left_Temp_Setpt <= 143.5455: 1 (38/6)
Front_Left_Temp_Setpt > 143.5455: 0 (4)
SubTree [S7]
Front_Left_Temp_Setpt <= 143.2987:
:...EngAout_N_Actl <= 1797.524:
:   :... EngAout_N_Actl > 917.1869: 0 (40/2)
:   :   EngAout_N_Actl <= 917.1869:
:   :   :...AirAmb_Te_Actl_UB <= 0.982906: 1 (4)
:   :       AirAmb_Te_Actl_UB > 0.982906: 0 (2)
:   EngAout_N_Actl > 1797.524:
:   :...AirAmb_Te_Actl <= 26.82122: 0 (2)
:       AirAmb_Te_Actl > 26.82122:
:       :...InCarTemp <= 27.47801: 1 (8)
:           InCarTemp > 27.47801: 0 (2)
Front_Left_Temp_Setpt > 143.2987:
:...AirAmb_Te_Actl <= 27.26608:
    :...Smart_Wiper_Motor_Stat_UB <= 0.8627451: 0 (4)
    :   Smart_Wiper_Motor_Stat_UB > 0.8627451: 1 (56/23)
    AirAmb_Te_Actl > 27.26608:
    :...AirAmb_Te_Actl <= 28.83702: 0 (48/2)
        AirAmb_Te_Actl > 28.83702:
        :...EngAout_N_Actl <= 1421.499:
            :...AirAmb_Te_Actl <= 29.78175: 1 (13)
            :   AirAmb_Te_Actl > 29.78175: 0 (4/1)
            EngAout_N_Actl > 1421.499:
            :...AirAmb_Te_ActlFilt <= 29.48828: 0 (9)
                AirAmb_Te_ActlFilt > 29.48828: 1 (3)
```

The Pre-established Predictive Activation Model for cooling can be interpreted in the same manner as those preceding it. A value of "0" after the value of the Certain Identifiable Condition—for example, the "0" in "AirAmb_Te_Actl-Filt>23.48864: 0 (82/22)"—identifies the controller 26 not activating the temperature altering element 24 to provide cooling or, if the controller 26 had already activated the temperature altering element 24 to provide cooling, deactivating the temperature altering element 24. Similarly, a value of "1" after the value of the Certain Identifiable Condition—for example, the "1" in "Overriding_ModeReq>3.433735: 1"—identifies the controller 26 activating the temperature altering element 24 to provide cooling. References to "SubTree" note a continuation of the tree from a reference point. For example, the "[S7]" in "InCar-Temp>25.34836: [S7]" refers to "SubTree [S7]" and the tree continues as if the "SubTree" were incorporated by reference.

The Pre-established Predictive Level Model(s), which establishes rules governs the level of temperature altering of the temperature altering element 24, can be formed pursuant to a neural net analysis or a multilayer perceptron classifier analysis of input data, relating to the Certain Identifiable Conditions, collected from the Test Vehicles as a whole or segmented, as explained above. There are a variety of analyses that can provide useful results, including the R (Version 3.2.5) statistic programming software and the MultilayerPerceptron classified through Weka (available at http://weka.sourceforge.net/doc.stable/weka/classifiers/functions/MultilayerPerceptron.html). There are other analyses available and this in not meant to be an exhaustive list. The rules of the Pre-established Predictive Level Model(s) then govern the level, via the controller 26, at which the temperature altering element 24 alters temperature within the first seating assembly 14 as a function of input data to the controller 26 relating to the Certain Identifiable Conditions present in vehicle 10.

The method can further comprise automatically deactivating the temperature altering element 24 pursuant to the Pre-established Predictive Activation Model(s), after initially automatically activating the temperature altering element 24 pursuant to the Pre-established Predictive Activation Model(s), if the collected data relating to the Certain Identifiable Conditions collected after initially automatically activating the temperature altering element 24 satisfy the rules of the Pre-established Predictive Activation Model for deactivation of the temperature altering element 24. For example, using the Pre-established Predictive Activation Model for heating formed pursuant to the C.50 program set forth above beginning with "AirAmb_Te_Actl>12.17466,"

the controller 26 would initially automatically activate the temperature altering element 24 to impart heat if the ambient temperature was greater than 12.17466 degrees Celsius ("AirAmb_Te_Actl>12.17466"), and the front passenger side temperature set point is greater than 154.9836 (i.e., approximately 77.3 degrees Fahrenheit) ("Front_Rt_Temp_Setpt>154.9836: 1"). However, if the controller 26 receives input that ambient temperature is still greater than 12.17466 degrees Celsius ("AirAmb_Te_Actl>12.17466") but the front passenger side temperature set point has been adjusted to less than or equal to 154.9836 (i.e., approximately 77.3 degrees Fahrenheit) ("Front_Rt_Temp_Setpt<=154.9836: 0"), then the controller 26 deactivates the temperature altering element 24.

The method of controlling the temperature altering element 24 can further comprise automatically reactivating the temperature altering element 24 pursuant to the Pre-established Predictive Activation Model(s), after automatically deactivating the temperature altering element 24 pursuant to the Pre-established Predictive Activation Model, if the collected data relating to the Certain Identifiable Conditions collected after deactivating the temperature altering element 24 again satisfy the rules for activation pursuant to the Pre-established Predictive Activation Model(s). The controller 26 can continue to collect data relative to the Certain Identifiable Conditions while the occupant is occupying the first seating assembly 14 and compare the collected data to the rules of the Pre-established Predictive Activation Model(s). If the collected data once again satisfy the rules of the Pre-established Predictive Activation Model(s) to activate the temperature altering element 24, then the controller 26 can reactivate the temperature altering element 24 accordingly. For example, again using the example Pre-established Predictive Activation Model for heating set forth above beginning with "AirAmb_Te_Actl>12.17466," the controller 26 automatically activates the temperature altering element 24 to impart heat, when the controller 26 receives input that the ambient temperature is greater than the certain temperature ("AirAmb_Te_Actl>12.17466") and the front passenger side temperature set point is greater than 154.9836 (i.e., approximately 77.3 degrees Fahrenheit) ("Front_Rt_Temp_Setpt>154.9836: 1"). As explained above, when the controller 26 receives input that does not satisfy the rules for activation, for example, the front passenger side temperature set point has changed to be less than or equal to the certain temperature ("Front_Rt_Temp_Setpt<=154.9836: 0), then the controller 26 deactivates the temperature altering element 24. However, if the controller 26 subsequently again receives input data relating to the Certain Identifiable Conditions that satisfy the rules of the Pre-established Predictive Activation Model for activation of the temperature altering element 24, such as the front passenger side temperature set point again being set to greater than 154.9836 ("Front_Rt_Temp_Setpt>154.9836: 1") while the ambient temperature is less than the certain temperature ("AirAmb_Te_Actl>12.17466"), then the controller 26 reactivates the temperature altering element 24 to impart heat. In other words, the controller 26 accepts input data relating to the Certain Identifiable Conditions in "real-time," dynamically considers whether the input data satisfies any of the rules of the Pre-established Predictive Activation Model(s) for activation or deactivation of the temperature altering element 24, and controls the activation/deactivation of the temperature altering element 24 accordingly.

The method of controlling the temperature altering element 24 can further comprise the occupant of the first seating assembly 14 manually deactivating the temperature altering element 24 via the user interface 32 (see FIG. 3A). For example, the occupant of the first seating assembly 14 could press the button 36 labeled "OFF" on the touch screen display 34 to manually deactivate the temperature altering element 24 of the first seating assembly 14 that the controller 26 had previously activated automatically pursuant to the Pre-established Predictive Activation Model(s). The controller 26 accepts this interface as input and consequently deactivates the temperature altering element 24.

The method of controlling the temperature altering element 24 can further comprise upon the occupant of the first seating assembly 14 manually deactivating the temperature altering element 24 via the user interface 32, recalibrating the Pre-established Predictive Activation Model into a New Predictive Activation Model accounting for the collected data relating to the Certain Identifiable Conditions existing when the occupant manually deactivated the temperature altering element 24 and thus establishing new rules for activation and deactivation of the temperature altering element 24. To do so, the controller 26 can be pre-loaded with software to perform classification and regression tree analyses, such as the mentioned C.50 program. The occupant's manual deactivation of the temperature altering element 24 that had been automatically activated by the controller 26 pursuant to the Pre-established Predictive Activation Model constitutes the occupant's rejection of the rule of the Pre-established Predictive Activation Model (and therefore the Certain Identifiable Conditions satisfying the rule) the controller 26 relied upon to automatically activate the temperature altering element 24. For example, using this rule of Pre-established Predictive Activation Model for heating set forth above—

```
AirAmb_Te_Actl <= 12.17466:
:...isMorning <= 0: 0 (120)
       isMorning > 0:
       :...turnOnHeat3 <= 0:
              :...tempDiff <= 3.670543: 0 (112)
              :      tempDiff > 3.670543: 1 (9/1)
```

—the controller 26 would automatically activate the temperature altering element 24 to impart heat if the controller 26 receives input that the ambient temperature is less than or equal to 12.17466 degrees Celsius ("AirAmb_Te_Actl<=12.17466"), the time of the day is a morning hour ("isMorning>0"), the occupant has not requested the vehicle 10 to heat the interior 12 with high blower speed ("turnOnHeat3<=0"), and the temperature differential between the ambient temperature and the in-vehicle 10 temperature is greater than 3.670543 degrees Celsius ("tempDiff>3.670543: 1"). However, if the controller 26 automatically activates the temperature altering element 24 to impart heat, and the occupant rejects the activation by manually deactivating the temperature altering element 24 via the user interface 32, then the controller 26 recalibrates the pre-established predictive model into a New Predictive Activation Model, accounting for the data related to the Certain Identifiable Conditions existing when the occupant manually deactivated the temperature altering element 24. The New Predictive Activation Model can weigh the occupant's decision heavily such that when the Certain Identifiable Conditions that existed when the occupant manually deactivated the temperature altering element 24 exist again, the controller 26 would not activate the temperature altering element 24 and would deactivate automatically the temperature altering element 24 if the temperature altering element 24 was activated. In other words, the New Predictive Activation Model can include a rule, as a function of those Certain Identifiable Conditions, deactivating or not activating the temperature altering element 24. Alternatively, the new predictive model can weigh the data related to the Certain Identifiable Conditions existing when the occupant manually deactivated the temperature altering element 24 the same as the data Test Vehicle from which the Pre-established Predictive Activation Model was originally derived. In any case, the New Predictive Activation Model will continue to utilize the data collected from the Test Vehicles as well as the data collected from the vehicle 10 relating to the Certain Identifiable Conditions existing when the occupant manually deactivated the temperature altering element 24.

The method of controlling the temperature altering element 24 can further comprise the occupant manually activating the temperature altering element 24 via the user interface 32. For example, the occupant of the first seating assembly 14 could press the button 44 labeled "ON" on the touch screen display 34 to activate the temperature altering element 24 of the first seating assembly 14. The controller 26 accepts this interface as input and consequently activates the temperature altering element 24 that the controller 26 either previously deactivated or did not activate pursuant to the Pre-established Predictive Activation Model (or New Predictive Activation Model).

The method of controlling the temperature altering element 24 can further comprise recalibrating the New Predictive Activation Model into a Newer Predictive Activation Model accounting for the collected data relative to the Certain Identifiable Conditions existing when the occupant manually activated the temperature altering element 24 and establishing new rules for activation and/or deactivation of the temperature altering element 24, upon the occupant manually activating the temperature altering element 24 via the user interface 32. The controller 26 records the data relative to the Certain Identifiable Conditions existing when the occupant manually activates the temperature altering element 24 and prepares a Newer Predictive Activation Model with new rules for activation using the data. Again, the Newer Predictive Activation Model can weigh heavily the data relating to the Certain Identifiable Conditions existing when the occupant manually activated the temperature altering element 24 with a new rule such that the controller 26 automatically activates the temperature altering element 24 when those Certain Identifiable Conditions again exist. Alternatively, the Newer Predictive Activation Model can weigh the data relative to the Certain Identifiable Conditions existing when the occupant manually activated the temperature altering element 24 the same as the other data previously replied upon to derive the Pre-established Predictive Activation Model. In general, the controller 26 continues to refine the predictive modeling (the Pre-established Predictive Activation Model(s) and subsequent recalibrations thereof) by performing a new CART analysis based on the data relative to the Certain Identifiable Conditions whenever the occupant of the first seating assembly 14 manually activates or deactivates the temperature altering element 24. Eventually, the predictive modeling will be refined according to the occupant's preferences and the occupant will no longer have the need to manually activate or deactivate the temperature altering element 24—the predictive modeling will activate or deactivate the temperature altering element 24 automatically to satisfy the occupant's preferences.

Refining the Pre-established Predictive Activation Model into the New Predictive Activation Model, the Newer Predictive Activation Model, and subsequent refinements thereof will identify the preferences of the occupant, including situations when the occupant desires the activation of the temperature altering element 24 for reasons other than in-vehicle 10 temperature or ambient temperature. For example, the occupant may desire the temperature altering element 24 to impart heat during the first several minutes on a commute to work, for therapeutic reasons. As another example, the occupant of the first seating assembly 14 may desire the temperature altering element 24 to impart cooling during the spring on weekend days (to ensure the occupant's comfort) when the front passenger side set point temperature is above a certain temperature (to ensure a passenger's comfort), as a compensation effect to compensate for the blown heated air attempting to satisfy the front passenger side set point temperature. A CART analysis of the collected data relating to the Certain Identifiable Conditions will learn this behavior and eventually automatically activate and deactivate the temperature altering element 24 accordingly. The CART analysis is thus a learning algorithm that provides a high degree of accuracy because the Certain Identifiable Conditions are considered across the entire history of the vehicle 10. Other possible non-learning methods, such as those involving weighted averages, will not be as accurate and will not account for time/day/season dependent behavior.

The method of controlling the temperature altering element 24 can further comprise determining, by comparing the collected data to the rules of Pre-established Predictive Level Model, which level of the several different levels of temperature altering the controller 26 will initially automatically set for the temperature altering element 24 and initially automatically setting the temperature altering element 24 to the determined level. In other words, when the controller 26 determines, based on the Pre-established Predictive Activation Model (or New Predictive Activation Model or Newer Predictive Activation Model) to automatically activate the temperature altering element 24, the controller 26 additionally determines, based on the Pre-established Predictive Level Model and the data relating to the Certain Identifiable Conditions, which level at which to set the temperature altering element 24 (e.g., low, medium, or high). While the temperature altering element 24 remains activated, the controller 26 dynamically compares the collected data to the rules of the Pre-established Predictive Level Model and adjusts the level of the temperature altering element 24 accordingly. If the rules of the Pre-established Predictive Level Model, based on the collected data after the activation of the temperature altering element 24, dictates that the temperature level of the temperature altering element 24 be changed, the controller 26 thus causes the temperature altering element 24 to alter temperature according to the level prescribed by the Pre-established Predictive Level Model.

The method of controlling the temperature altering element 24 can further comprise the occupant of the first seating assembly 14 manually changing the level of temperature altering for the temperature altering element 24 via the user interface 32. For example, the controller 26, pursuant to the Pre-established Predictive Level Model, could have initially set the temperature altering element 24 to alter temperature at level 3 (HIGH) and the occupant of the first seating assembly 14 could subsequently press the button 42 labeled "LOW" on the touch screen display 34 to cause the temperature altering element 24 to alter temperature at the relatively lower level. The controller 26 accepts this interface as input and consequently causes the temperature altering element 24 to alter temperature at this relatively low level.

The method of controlling the temperature altering element 24 can further comprise recalibrating the Pre-established Predictive Level Model into a New Predictive Level Model accounting for the collected data relative to the Certain Identifiable Conditions existing when the occupant manually changed the level of temperature altering and establishing new rules governing the level of temperature altering for the temperature altering element 24 when the temperature altering element 24 is automatically activated, upon the occupant manually changing the level of temperature altering for the temperature altering element 24 via the user interface 32. The controller 26 records the data relative to the Certain Identifiable Conditions existing when the occupant manually changed the level of temperature altering and prepares a New Predictive Level Model accounting for these Certain Identifiable Conditions. In general, the controller 26 continues to refine the predictive modeling governing the level of temperature altering by performing a new neural net analysis or a multilayer perceptron classifier analysis including the collected data relative to the Certain Identifiable Conditions whenever the occupant of the first seating assembly 14 manually alters the level of the temperature altering element 24. The multilayer perceptron classifier analysis, like the CART analysis, is thus a learning algorithm that provides a high degree of accuracy because the Certain Identifiable Conditions are considered across the entire history of the vehicle 10. Other possible non-learning methods, such as those involving weighted averages, will not be as accurate.

The method of controlling the temperature altering element 24 can further comprise, after the occupant manually changes the level of temperature altering, automatically deactivating the temperature altering element 24 and then automatically reactivating the temperature altering element 24. When the controller 26 automatically reactivates the temperature altering element 24 pursuant to the Pre-established Predictive Activation Model (or recalibrated version thereof), the method can further comprise determining, by comparing the collected data to the New Predictive Level Model, which level of the several different levels of temperature altering the controller 26 will initially automatically set for the temperature altering element 24 and automatically setting the temperature altering element 24 to the determined level. In other words, in a subsequent session of automatic activation of the temperature altering element 24, the controller 26 utilizes the rules of the New Predictive Level Model to determine at which level the temperature altering element 24 will be set.

The method of controlling the temperature altering element 24 can further comprise removing the occupant from the first seating assembly 14, occupying the first seating assembly 14 with a second occupant, and recognizing that the second occupant is different than the first occupant. The controller 26 can determine that the second occupant different than the first occupant is occupying first seating assembly 14 in various ways, such as by the weight of the second occupant as measured by the first seating assembly 14 compared to the weight of the first occupant. Alternatively, the second occupant can instruct the controller 26 via the user interface 32 (such as by selecting a user profile dedicated to the second occupant) that the second occupant rather than the first occupant is occupying the first seating assembly 14.

The method of controlling the temperature altering element 24 can further comprise collecting data relative to the Certain Identifiable Conditions while the second occupant is occupying the first seating assembly 14 and determining, by comparing the only the data collected while the second occupant is occupying the first seating assembly 14, and not the data collected with the first occupant was occupying the first seating assembly 14, to the rules of the Pre-established Predictive Activation Model(s), whether data collected satisfy the rules of the Pre-established Predictive Activation Model(s) so as to initially automatically activate the temperature altering element 24. In other words, the controller 26 recognizes that the second occupant occupies the first seating assembly 14 and begins anew with the Pre-established Predictive Activation Model(s), rather than the predictive activation model recalibrated to account for the first occupant's manual activations or deactivations of the temperature altering element 24 (such as the New Predictive Activation Model(s) or subsequent recalibrated version thereof). Therefore, only the second occupant's manual activations and deactivations of the temperature altering element 24 will cause recalibration of the Pre-established Predictive Activation Model(s) into subsequent predictive models. The method of controlling the temperature altering element 24 can further comprise initially automatically activating the temperature altering element 24 while the second occupant is occupying the first seating assembly 14. In other words, the controller 26, comparing the data collected relating to the Certain Identifiable Conditions to the rules of the Pre-established Predictive Activation Model(s), can subsequently activate the temperature altering element 24 accordingly while the second occupant is occupying the first seating assembly 14 to impart heat or cooling as the data collected and the rules of the Pre-established Predictive Activation Model(s) dictate.

The methods of automatically controlling the activation/deactivation of the temperature altering element 24 Pre-established Predictive Activation Model and the level of temperature altering pursuant to the Pre-established Predictive Level Model (and subsequent recalibrated iterations thereof) provide advantages over other methods that control all means of temperature control in a vehicle (such as blower level, temperature set points, etc.). For example, the occupant of the first seating assembly 14 may simply desire the controller 26 to exercise automatic control of the temperature altering element 24 in the first seating assembly 14 but not automatic control over the entire climate in the interior 12 of the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A method of controlling a temperature altering element within a seating assembly of a vehicle comprising:
   with the temperature altering element configured to impart heating or cooling to an occupant of the seating assembly within which the temperature altering element is disposed, and with the vehicle further comprising:
   a controller in communication with the temperature altering element, the controller including a Pre-established Predictive Activation Model setting forth rules governing activation of the temperature altering element as a function of data relating to Certain Identifiable Conditions; and a user interface configured to allow the temperature altering element to be manually activated or deactivated;

collecting data relating to the Certain Identifiable Conditions while a first occupant is occupying the seating assembly;

determining, by comparing the collected data to the rules of the Pre-established Predictive Activation Model, whether the collected data satisfies the rules of the Pre-established Predictive Activation Model so as to initially automatically activate the temperature altering element; and automatically activating the temperature altering element;

wherein, the rules of the Pre-established Predictive Activation Model are a function of at least one of the following Certain Identifiable Conditions: (i) time of day; (ii) engine speed; (iii) vehicle speed; (iv) whether windshield wipers have been activated; (v) level at which a climate control system in the vehicle is blowing air; (vi) whether air conditioning has been activated; (vii) whether a rear window defrost has been activated.

2. The method of claim 1,
wherein, the Pre-established Predictive Activation Model was formed pursuant to a classification and regression tree analysis of input data related to the Certain Identifiable Conditions collected from other operators of other vehicles.

3. The method of claim 1,
wherein, the Pre-established Predictive Activation Model establishes rules that are a function of at least the following Certain Identifiable Conditions: ambient temperature; temperature set point for an interior of the vehicle; time of day; whether the first occupant has requested the vehicle to heat the interior with a blower at a certain blower speed; temperature of the interior of the vehicle; and temperature differential between the ambient temperature and the in-vehicle temperature.

4. The method of claim 3,
wherein, the ambient temperature is greater than a certain temperature, and the controller automatically activates the temperature altering element pursuant to the Pre-established Predictive Activation Model as a function of the ambient temperature being greater than the certain temperature and data relating to at least one other of the Certain Identifiable Conditions excluding the ambient temperature.

5. The method of claim 1,
wherein, the Pre-established Predictive Activation Model establishes rules that are a function of at least the following Certain Identifiable Conditions: whether windshield wipers have been activated; whether air conditioning has been activated; temperature set point for an interior of the vehicle; ambient temperature; level at which a climate control system in the vehicle is blowing air; engine speed; vehicle speed; and in-vehicle temperature.

6. The method of claim 5,
wherein, windshield wipers are not activated, and the controller automatically activates the temperature altering element pursuant to the Pre-established Predictive Activation Model as a function of data relating to the windshield wipers not being activated and at least one other of the Certain Identifiable Conditions excluding whether windshield wipers have been activated.

7. The method of claim 1,
wherein, the Pre-established Predictive Activation Model establishes rules that are a function of at least the following Certain Identifiable Conditions: in-vehicle temperature; ambient temperature; level at which a climate control system in the vehicle is blowing air; whether a rear window defrost has been activated; vehicle speed; whether air conditioning has been activated; engine speed; and whether windshield wipers have been activated.

8. The method of claim 7,
wherein, in-vehicle temperature is greater than a certain temperature, and the controller automatically activates the temperature altering element to impart cooling pursuant to the Pre-established Predictive Activation Model as a function of the in-vehicle temperature being greater than the certain temperature and data relating to at least one other of the Certain Identifiable Conditions excluding in-vehicle temperature.

9. The method of claim 1,
wherein, the Pre-established Predictive Activation Model establishes rules for activation of the temperature altering element to provide cooling and the rules are a function of data related to at least the following Certain Identifiable Conditions: ambient temperature; in-vehicle temperature; whether a rear window defrost has been activated; and a temperature set point for an interior of the vehicle;

wherein, the ambient temperature is less than a certain temperature and the in-vehicle temperature is greater than another certain temperature; and wherein, the controller automatically activates the temperature altering element to impart cooling pursuant to the rules of the Pre-established Predictive Activation Model as a function of the ambient temperature being less than the certain temperature, the in-vehicle temperature being greater than the other certain temperature, and data relating to at least one other of the Certain Identifiable Conditions including vehicle speed.

10. The method of claim 1 further comprising:
automatically deactivating the temperature altering element pursuant to the Pre-established Predictive Activation Model, after initially automatically activating the temperature altering element pursuant to the Pre-established Predictive Activation Model, the collected data relating to the Certain Identifiable Conditions collected after initially automatically activating the temperature altering element satisfying the rules of the Pre-established Predictive Activation Model for deactivation of the temperature altering element.

11. The method of claim 10 further comprising:
automatically reactivating the temperature altering element pursuant to the Pre-established Predictive Activation Model, after automatically deactivating the temperature altering element pursuant to the Pre-established Predictive Activation Model, the collected data relating to the Certain Identifiable Conditions collected after deactivating the temperature altering element again satisfying the rules for activation pursuant to the Pre-established Predictive Activation Model.

12. The method of claim 11 further comprising:
after the first occupant manually deactivates the temperature altering element via the user interface, recalibrating the Pre-established Predictive Activation Model into a new predictive activation model accounting for the collected data relative to the Certain Identifiable Conditions existing when the occupant manually deactivated the temperature altering element and establishing new rules for activation or deactivation of the temperature altering element.

13. The method of claim 12 further comprising:
after the first occupant manually activates the temperature altering element via the user interface, recalibrating the new predictive activation model into a newer predictive activation model accounting for the collected data relative to the Certain Identifiable Conditions existing when the occupant manually activated the temperature altering element and establishing new rules for activation or deactivation of the temperature altering element.

14. The method of claim 13,
the temperature altering element being adjustable to several different levels of temperature altering;
the controller further including a Pre-established Predictive Level Model establishing rules governing which level of the several different levels of temperature altering the controller will initially automatically set for the temperature altering element, the rules of the Pre-established Predictive Level Model being a function of one or more of the Certain Identifiable Conditions; and
the user interface further configured to allow the first occupant to select manually the level of the several different levels of temperature altering;
the method further comprising:
  determining, by comparing the collected data to the rules of Pre-established Predictive Level Model, which level of the several different levels of temperature altering the controller will initially automatically set for the temperature altering element; and
  initially automatically setting the temperature altering element to the determined level.

15. The method of claim 14,
wherein, the Pre-established Predictive Level Model is formed pursuant to a multilayer perceptron classifier analysis of input data relating to the Certain Identifiable Conditions collected from other vehicles.

16. The method of claim 14 further comprising:
after the first occupant manually changes the level of temperature altering for the temperature altering element via the user interface, recalibrating the Pre-established Predictive Level Model into a new predictive level model accounting for the collected data relative to the Certain Identifiable Conditions existing when the occupant manually changed the level of temperature altering and establishing new rules governing the level of temperature altering for the temperature altering element when the temperature altering element is automatically activated;
automatically deactivating the temperature altering element;
automatically reactivating the temperature altering element;
determining, by comparing the collected data to the rules of the new predictive level model, which level of the several different levels of temperature altering the controller will initially automatically set for the temperature altering element; and
automatically setting the temperature altering element to the determined level.

17. The method of claim 16 further comprising:
recognizing that a second occupant, different than the first occupant, is occupying the seating assembly;
collecting data relative to the identifiable conditions while the second occupant is occupying the seating assembly;
determining, by comparing only the data collected while the second occupant is occupying the seating assembly, and not the data collected while the first occupant was occupying the seating assembly, to the rules of the Pre-established Predictive Activation Model, whether data collected satisfy the rules of the Pre-established Predictive Activation Model so as to initially automatically activate the temperature altering element; and
initially automatically activating the temperature altering element while the second occupant is occupying the seating assembly.

* * * * *